United States Patent
Powelson et al.

(10) Patent No.: US 6,940,790 B1
(45) Date of Patent: Sep. 6, 2005

(54) WRITE COMPENSATION FOR A MULTI-LEVEL DATA STORAGE SYSTEM

(75) Inventors: Judith C. Powelson, Alameda, CA (US); David K. Warland, Davis, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/496,898

(22) Filed: Feb. 2, 2000

(51) Int. Cl.[7] .................................. G11B 5/09
(52) U.S. Cl. .................... 369/47.15; 369/47.51; 369/59.12
(58) Field of Search .................... 369/47.17, 47.18, 369/47.25, 47.27, 47.28, 47.35, 47.5, 47.51, 47.52, 47.53, 47.55, 53.26, 53.31, 53.34, 59.12, 59.21, 59.23, 59.24, 47.15

(56) References Cited

U.S. PATENT DOCUMENTS 5,726,965 A    3/1998  Hajjar et al.
6,160,784 A   12/2000  Maeda et al. ............... 369/116
6,269,060 B1 *  7/2001  Harvey et al. ............ 369/47.28

OTHER PUBLICATIONS

Fredricksen, Harold, "A Survey of Full Length Nonlinear Shift Register Cycle Algorithms", SIAM Review, vol. 24, No. 2, Apr. 1982, pp. 195–221.

* cited by examiner

Primary Examiner—Paul W. Huber
(74) Attorney, Agent, or Firm—Chistopher P. Maiorana

(57) ABSTRACT

A system and method are disclosed for compensating during a data writing process for a transformation of input data by an optical disc data storage channel. A write strategy matrix is derived that maps a plurality of input sequences to a plurality of write strategy parameters. The input sequences each include a plurality of input data elements. When an input sequence is received, the write strategy matrix is used to determine in selected write strategy parameter that corresponds to the input sequence.

59 Claims, 13 Drawing Sheets

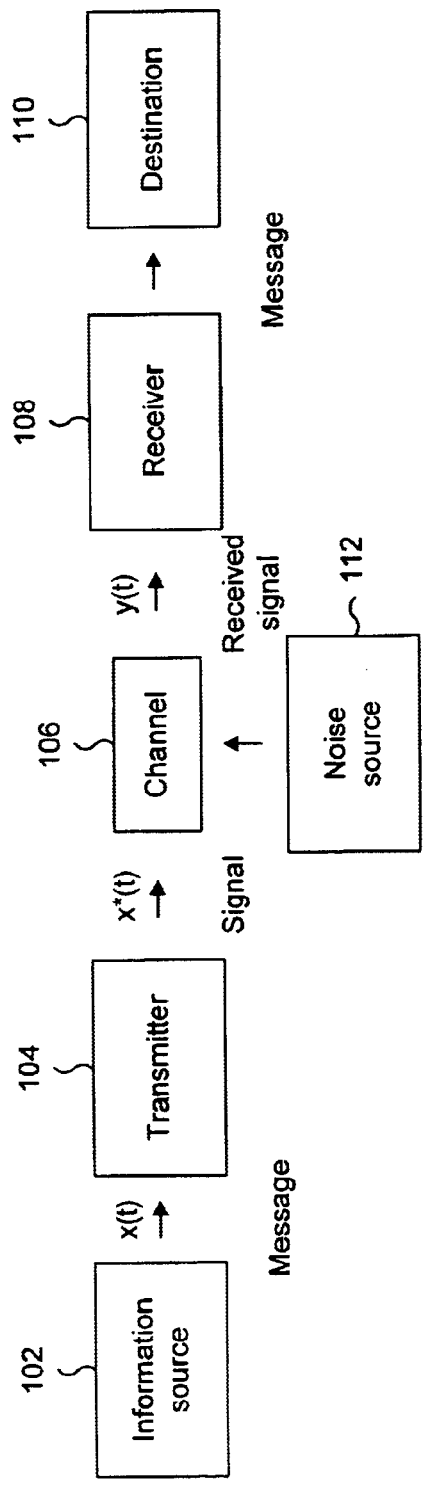
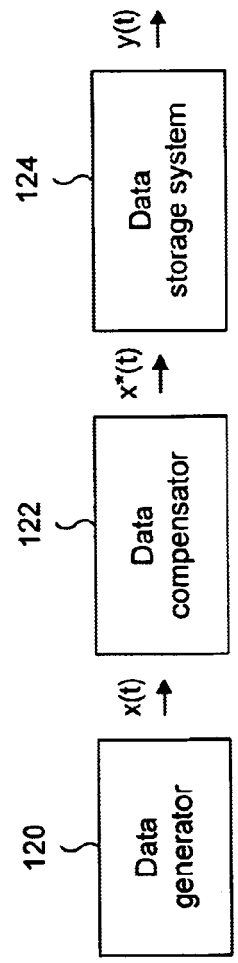
Figure 1A
Prior Art
Figure 1B

Write compensation system

Data formatter

Data formatter

Write-strategy calculator

ELC = Equal Level Criteria
CDC = Constant Discriminability Criteria

WRITE COMPENSATION FOR A MULTI-LEVEL DATA STORAGE SYSTEM

CROSS REFERENCE TO RELATED APPLICATIONS

This application is related to U.S. patent application Ser. No. 09/496,897, entitled "DC Control Of A Multilevel Signal," filed Feb. 2, 2000, now U.S. Pat. No. 6,604,219, issued Aug. 5, 2003, which is incorporated herein by reference for all purposes and U.S. patent application Ser. No. 09/496,387, entitled "Generating A Multilevel Calibration Sequence For Precompensation," filed Feb. 2, 2000, now U.S. Pat. No. 6,608,807, issued Aug. 19, 2003, which is incorporated herein by reference for all purposes.

FIELD OF THE INVENTION

The present invention relates generally to data storage. More specifically, a system and method for write compensation is disclosed.

BACKGROUND OF THE INVENTION

To maximize the storage capacity for a given volume of recording medium, it is desirable that a storage system have as high an information density as possible. As the information density increases, however, regions of data symbols increase their "interference" with both the recording and recovery of neighboring symbols. Without careful compensation for such interference, information may be distorted or lost. While it is possible to compensate for this inter-symbol-interference (ISI) after readout, it is most desirable to compensate for ISI before recording to minimize noise enhancement resulting from data passing through the system.

DESCRIPTION OF LINEAR AND NONLINEAR ISI

Mathematically, ISI can be classified into two types: 1) linear ISI and 2) nonlinear ISI. Equation (1) formalizes this definition.

$$y(t) = h_0 + \sum_{n=1}^{\infty} \int_{-\infty}^{+\infty} \cdots \int_{-\infty}^{+\infty} h_n(\tau_1, \cdots, \tau_n) x(t-\tau_1) \cdots x(t-\tau_n) d\tau_1 \cdots d\tau_n \quad 1)$$

Here, the input time function $x(t)$ is related to the output $y(t)$ of a nonlinear system by a Volterra series with kernels $h_n$ and additive zero-mean random noise $\eta(t)$. If the relationship between the input $x(t)$ and output $y(t)$ is linear, the first two terms containing $h_0$ and $h_1(\tau)$ are all that are necessary to completely describe the system. If the relationship between input and output includes nonlinear ISI, additional terms are necessary to describe the relationship.

Because of the increased computational complexity of processing or removing nonlinear distortions in a data storage system, it is desirable to make the system behave like a linear channel. In a linear channel, the relationship between the data input and the recovered signal can be completely described by a convolution of a linear filter with the input plus some additive random noise. From a coding and signal processing perspective, linearity is also desirable because historically there is a massive amount of theoretical work completed using linear channels. If a system can be made to behave linearly, the techniques and knowledge resulting from this large body of work can then be applied.

In one embodiment of a multi-level (ML) optical data storage system, a long track is divided into a large number of small regular data cells. A laser is used to either write to or read from the individual cells. In such an optical storage system, a primary source of inter-symbol-interference (ISI) is the size of the reading and writing laser beam(s). As the data cells are packed together, the effects of neighboring symbols on both the formation and recovery of the data cells increases. During read-back, the reading laser beam illuminates a region of material that contains more than one data cell. As a result, the signal associated with the data cell of interest includes a linear convolution of signals from its neighbors.

During the writing process, effects such as thermal diffusion and the overlap from the tails of a Gaussian recording laser beam modify the state and response of neighboring cells. These effects produce nonlinear ISI. Diffraction effects (which are linear in amplitude, not intensity) also contribute to nonlinear ISI, as do non-ideal effects related to the read-back process such as nonlinearity of the photodiode and amplifiers. As a result of the above sources of ISI, the recovered data signal from a high-density recording and read-back system is corrupted by linear ISI, nonlinear ISI, and noise.

Variation in the recording process due to systematic variation of either the media response or the writing process also corrupts the recovered data signal. For example, variation of the size and shape of the reading beam during read-back may change the amount of inter-symbol-interference. Variation in the sensitivity of the media during recording may change the size and shape of the recorded marks. Because these effects result in a systematic or deterministic source of error, the impact of many of these error sources could potentially be minimized through careful write compensation.

SHAPING THE CHANNEL

FIG. 1A is a diagram illustrating Shannon's original abstraction of a general communication system. An information source 102 generates a signal x(t) which is transmitted by a transmitter 104 through the system or "channel" 106 to receiver 108 and a final destination 110. Along the path from the information source to the destination, the transmitted signal may be corrupted by both deterministic and random transformations. For example, a random noise source 112 is shown as an input to channel 106. It is the goal of the transmitter in a communication or storage system to compensate for the effects of such corruption. For example, a transmitter in a robust information system will add redundancy to combat the particular noise structure involved.

It would be useful if a way could be provided to write compensate for deterministic transformations that occur in the channel. Write compensation refers to compensation that occurs during the writing process. Read compensation refers to compensation that occurs during the reading process. Compensation in general may occur during the writing process and/or during the reading process.

If a particular reading system design can only recover data that has undergone a linear transformation, then any nonlinear transformation may be classified as noise. It would be desirable to remove as many deterministic sources of such "noise" as possible using write compensation so that a reading system designed to compensate for linear transformations by the channel may be used effectively.

In general, both read and write compensation techniques are needed to maintain an acceptable signal to noise ratio (SNR) as information density increases on a storage medium. To the extent that write compensation can be used to cause the channel output to be linear or to conform to some desired target, the reading system may be simplified. Also, techniques are needed for compensating for transformations caused by various sources such as physical variations in a recording device or recording material response that occur as a result of manufacturing, wear, or environmental conditions.

SUMMARY OF THE INVENTION

Accordingly, compensation techniques are disclosed that allow the storage capacity for a given volume of recording medium to be increased without causing errors when data is read. In one embodiment, a method for shaping the input/output relationship for an optical data storage system such that the relationship is linear or other desired target is described. In one embodiment, a method for shaping the input/output relationship for an optical data storage system such that it maximizes the system signal-to-noise ratio is described. In one embodiment, a method for compensating for variations in a recording device or recording material response such as would occur in a typical manufacturing process or in a typical change of environmental operating condition is described.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, a system and method are disclosed for compensating during a data writing process for a transformation of input data by an optical disc data storage channel. A write strategy matrix is derived that maps a plurality of input sequences to a plurality of write strategy parameters. The input sequences each include a plurality of input data elements. When an input sequence is received, the write strategy matrix is used to determine a selected write strategy parameter that corresponds to the input sequence.

In one embodiment, a system and method are disclosed for improving a write strategy matrix that maps a plurality of input sequences to a plurality of write strategy parameters. The input sequences each include a plurality of input data elements. A set of input sequences are written to an optical data storage channel using the write strategy matrix. The set of input sequences are transformed using a target channel model to obtain transformed data. Output data is recovered from the optical data storage channel. The recovered output data is compared to the transformed input data to determine a difference between the recovered output data and the transformed input data. The write strategy matrix is adjusted to decrease the difference between the recovered output data and the transformed input data.

In one embodiment, a system and method for deriving a write strategy matrix that maps a plurality of input sequences to a plurality of write strategy parameters is disclosed. The input sequences each include a plurality of input data elements. A first input sequence is written to an optical data storage channel. A first sequence of output data is recovered from the optical data storage channel. The first sequence of output data is used to map the plurality of data elements to a plurality of initial write strategy parameters. A second input sequence is written to the optical data storage channel using the initial write strategy parameters. The second input sequence includes a plurality of subsequences. A second sequence of output data is recovered from the optical data storage channel. The second sequence of output data is used to map the plurality of subsequences to the plurality of write strategy parameters.

In one embodiment, a system and method for deriving a write strategy matrix that maps a plurality of input sequences to a plurality of write strategy parameters is disclosed. The input sequences each include a plurality of input data elements. An input sequence is written to an optical data storage channel. The input sequence includes a plurality of subsequences. A sequence of output data is recovered from the optical data storage channel. The sequence of output data is used to map the plurality of subsequences to the plurality of write strategy parameters.

In one embodiment, a system and method of improving a write strategy matrix that maps a plurality of input sequences to a plurality of write strategy parameters is disclosed. The input sequences each include a plurality of input data elements. The set of input sequences is transformed using a target channel model to obtain a first set of transformed data. The set of input sequences is also transformed using a simulated channel model to obtain a second set of transformed data. The first set of transformed data is compared to the second set of transformed data to determine a difference between the first set of transformed data to the second set of transformed data and the write strategy matrix is adjusted to decrease the difference between the first set of transformed data to the second set of transformed data.

In one embodiment, a system and method of improving a write strategy matrix that maps a plurality of input sequences to a plurality of write strategy parameters is disclosed. The input sequences each include a plurality of input data elements. A set of input sequences is written to an optical data storage channel using the write strategy matrix. The set of input sequences is transformed using a target channel model to obtain transformed data. The output data is recovered from the optical data storage channel. The recovered output data is compared to the transformed input data to determine a difference between the recovered output data and the transformed input data and the write strategy matrix is adjusted to decrease the difference between the recovered output data and the transformed input data.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 1A is a diagram illustrating Shannon's original abstraction of a general communication system.

FIG. 1B is a diagram illustrating a system with write compensation. A data generator 120 generates input data.

DETAILED DESCRIPTION

Figure 2:
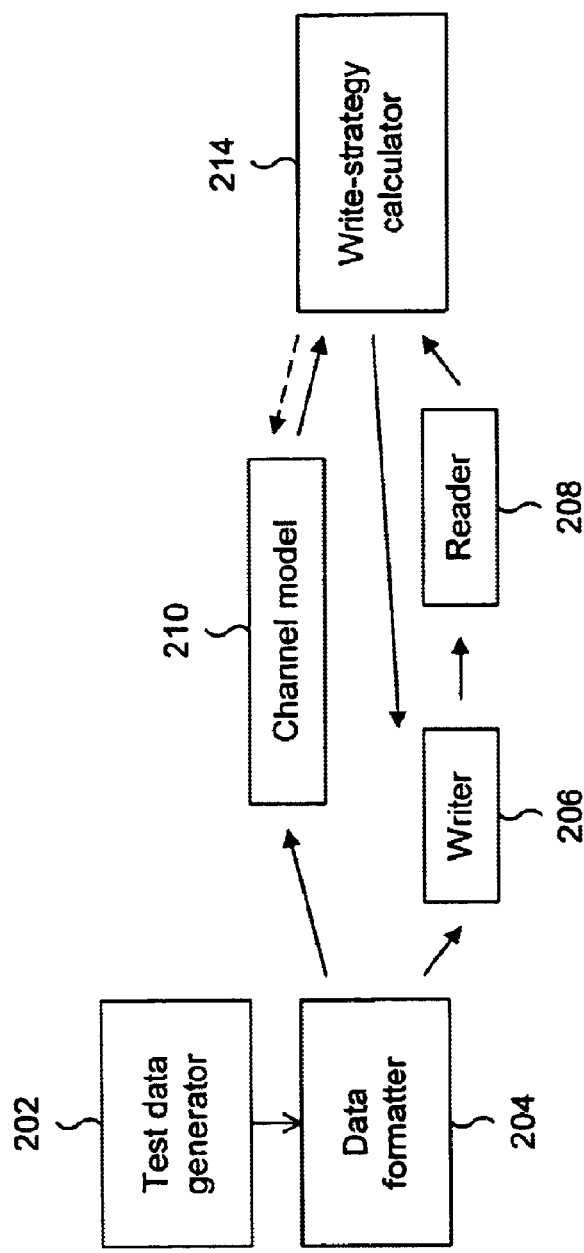
FIG. 2 is a block diagram illustrating a write compensation system such as may be included in data compensator 122 of FIG. 1B.

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Example Multi-Level Optical Data Storage System

In one embodiment, this invention applies to the methods of writing marks on a phase change material as described in U.S. patent application Ser. No. 09/373,916, filed Aug. 12, 1999, entitled "High Density Data Write Strategy" which is herein incorporated by reference, hereinafter O'Neill et. al. As described therein, marks can be written in a manner such that their size can be less than the size of the focused spot of a writing laser. By forming marks smaller than the reading laser beam, the reflectivity of a region of material can be varied with great precision. The reflectivity of a region is controlled by varying the relative amount of material in crystalline and amorphous phases. The total amount of crystalline and amorphous material in a region is controlled by creating marks of various sizes or shapes. In turn, the mark size and shape is controlled by placing the leading and trailing edges of laser pulses such that the timing of a second laser pulse further modifies the region of material irradiated by a first pulse. Additional modification of the mark size and shape results from controlling the time course of the laser power during the pulse.

When a reading laser is incident on a region of recorded material, the reflected light can be measured and the state of the region can be determined. The state of the region represents stored data. Multiple levels ($n \geq 2$) of reflectivity are possible. Different levels of reflectivity represent different data levels.

An ideal multi-level (ML) optical data storage system would read and recover a multi-level data pattern without any distortion or loss of data. In practice however, the data symbols are corrupted by deterministic and random processes during recording and read-back. Write compensation is used during the writing process to shape the relationship between the system input and output, thus controlling the deterministic or systematic sources of error.

FIG. 1B is a diagram illustrating a system with write compensation. A data generator 120 generates input data. Data compensator 122 provides write compensation so that the input data to Data storage system 124 is transformed in a manner that compensates for the manner that Data storage system 124 transforms the data.

The Write compensation techniques described herein may be applied to any writing system that writes to any data channel, including data storage channels as well as data transmission channels. In general, a writing system that includes a laser will have various write strategy parameters. These write strategy parameter may include, among other things, laser power and numerous parameters that control the shape and timing of laser pulses including pulse width, duty cycle, frequency and spacing of pulses, as well as various possible pulse shaping parameters. The input data controls the write strategy parameters, causing the input data to be written to the disc. Write compensation is implemented by altering the way that the input data is mapped to the write strategy parameters. In one embodiment, this is accomplished using a write strategy matrix (WSM).

In one embodiment that implements Write compensation for the writing system described in O'Neill et. al., input data is mapped to write strategy parameters that precisely control the time course of writing laser pulses. The write compensation process alters the mapping of the input data to the write strategy parameters in a manner that alters the precise time course of the writing laser power. More than one element of the input data sequence controls the writing laser power at any given time. In one embodiment, three input data elements: a previous, a current, and a subsequent input data element are used to determine a current set of write strategy parameters. In another embodiment, five input data elements are used to determine a current set of write strategy parameters. It is also possible to have different numbers of previous and subsequent input data elements or to have only a single input data element control the write strategy parameters.

Write Compensation System Overview

FIG. 2 is a block diagram illustrating a write compensation system such as may be included in data compensator 122 of FIG. 1B. A test pattern that is created by a test data generator 202 is passed to a data formatter 204 where the data is organized and various calibration and control patterns are added. The resulting formatted test pattern is separately passed through the physical channel (writer 206 and reader 208) and through a channel model 210.

The data sequence passed to the writer is converted to instructions that control the laser. This instruction set includes the specification of all relevant write strategy parameters for a given data sequence and is referred to as the write strategy-matrix. The recorded data is then read back by the reader, resulting in a recovered data pattern. The formatted test pattern that passes through the channel model results in a target data pattern. The write strategy-calculator (WSC) 214 compares the average recovered data pattern to the target data pattern and calculates an update to the write instruction set contained in the write strategy matrix. Thus, the write strategy calculator changes the write strategy matrix and thereby changes how the input data sequence is mapped to the relevant write strategy parameters.

To measure the result of the update to the write strategy matrix, the test pattern is written and read again and the above procedure is repeated. If the mean-squared-difference between the target and recovered data pattern is less than a maximum threshold error value, the procedure terminates successfully. If the difference remains above the maximum threshold error value, the procedure iterates until the error converges to a value less than the maximum threshold error value.

In one embodiment, the channel model is not fixed during the iterations. In this embodiment, a best linear fit to the data is computed as the channel model and input to the write strategy calculator. In another embodiment, the channel model is fixed to a particular target. In another embodiment, the signal dynamic range is optimized as part of the write strategy iteration process.

Test Pattern Generator and Formatter

Figure 3:
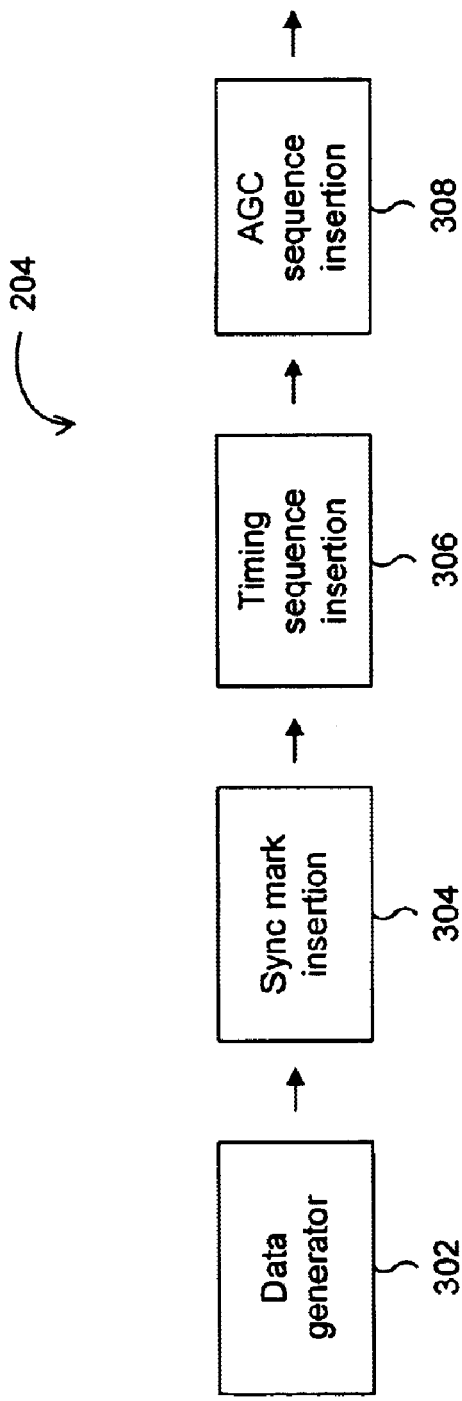
FIG. 3 is a diagram illustrating a more detailed breakdown data formatter 204 shown in FIG. 2.

Various control sequences may be added to the test pattern of interest to aid in the recovery of data. The most significant of these types of control sequences include synchronization marks, timing and alignment sequences, and automatic-gain-control (AGC) sequences such as are described in U.S. patent application Ser. No. 09/253,808, filed Feb. 18, 1999, entitled "Architecture For Reading A Multi-Level Signal From An Optical Disc", now U.S. Pat. No. 6,275,458, issued Aug. 14, 2001, which is herein incorporated by reference. FIG. 3 is a diagram illustrating a more detailed breakdown of data formatter 204 shown in FIG. 2. A data generator 302 outputs data to a sync mark insertion block 304. The output of sync mark insertion block 304 is input to a timing sequence insertion block 306. The output of timing sequence insertion block 306 is input to a AGC sequence insertion block 308.

In one embodiment, two types of test patterns are used in the write compensation process. Type I patterns are used in determining the level placements and initializing the write strategy matrix and type II patterns are used in the write strategy matrix update process.

The process of initializing the write strategy matrix is important for proper functioning of the write compensation procedure. The initialization procedure begins with a measurement of the relationship between the write strategy parameters and the resulting reflectivity of the data mark. Based on the output detected when the type-I pattern is written to the disc, the write strategy calculator (WSC) chooses write strategy parameters that span about 10% less than the full range of the media response. This choice maximizes the recovered signal strength. FIG. 6B is a graph illustrating an example of such a relationship and the typical nonlinear response of an optical media to a write strategy parameter. Points A and D label the minimum and maximum reflectivity of the media achieved by the write strategy. Points B and C mark the useable dynamic range for the initial write strategy matrix values (typically 10% less than the saturated response). The variance of all parts of this curve are also measured and used to optimally place the levels with the techniques described below.

The purpose of the type-I pattern is to sample reflectivity values resulting from a particular choice of write strategy parameters. The resulting data is then used by the write strategy calculator to initialize the write strategy matrix. An example of a type-I pattern for the write strategies outlined in U.S. patent application Ser. No. 09/373,916, filed Aug. 12, 1999, entitled "High Density Data Write Strategy" which is herein incorporated by reference, hereinafter O'Neill et. al. is given below. In the example given, the laser power associated with each pulse is fixed and the pulse width is chosen as the write strategy parameter that is varied by the input data to control the reflectivity of a mark.

It should be noted that in this example, a single write strategy parameter is varied to modulate the output. In other embodiments, a combination of write strategy parameters are used. The combination of write strategy parameters may be specified by the write strategy matrix or, alternatively a single index may be determined by the write strategy matrix that maps to a plurality of write strategy parameters.

Figure 6A:
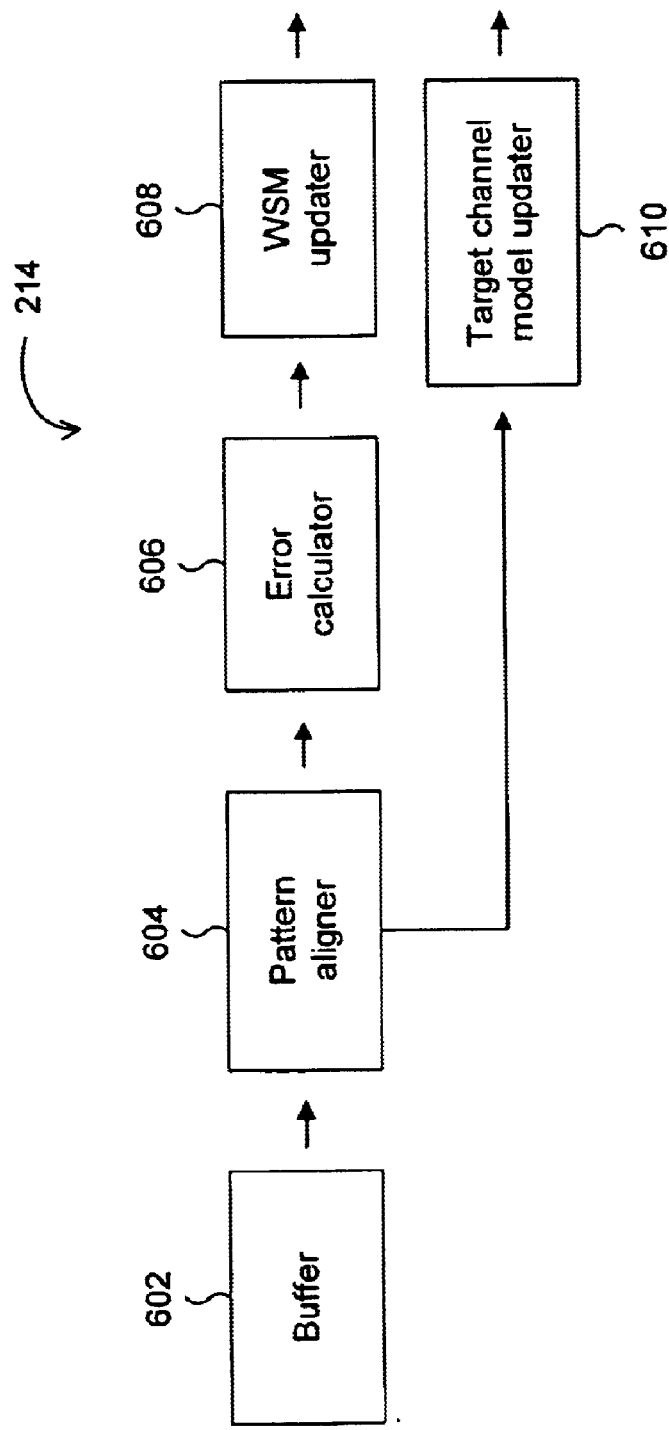
FIG. 6A is a diagram illustrating in further detail write strategy calculator 214 shown in FIG. 2.
Figure 6B:
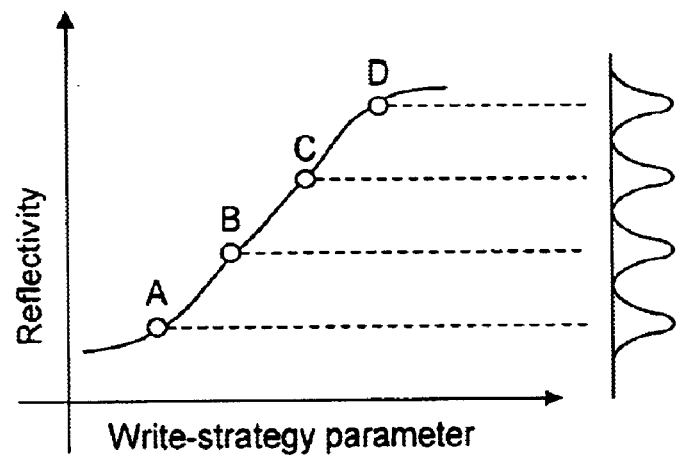
FIG. 6B is a graph illustrating an example of the typical nonlinear response of an optical media to a write strategy parameter.
Figure 6C:
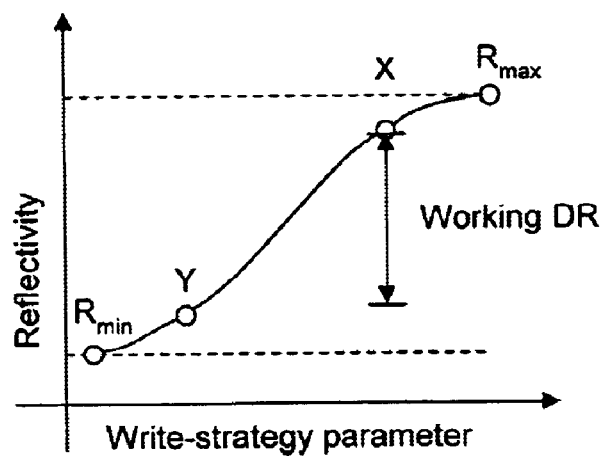
FIG. 6C is a graph illustrating an example of a sequential scan through pulse width and the resulting changes in reflectivity.

FIG. 6C is a graph illustrating an example of a sequential scan through pulse width and the resulting changes in reflectivity. The type-I test pattern "T1" that was used in this example can be represented by a series of integers representing pulse width: 1,2,3,4,5,6,7,8,9,10,11,12,4,0,4 where 0=laser off. The last elements of the sequence, 4,0,4, are included as a sync mark.

For small marks, the effects of ISI result in an ambiguous measurement of an isolated mark's reflectivity. For this reason, the effects of ISI are controlled by placing the mark of interest within a series of neighbors of the same mark type. Therefore, it is preferable to repeat each mark numerous times in the test pattern. Repeating each mark numerous times in the test pattern controls the intersymbol interference between marks. Measurements taken in the middle of a series of identical marks include intersymbol interference only from neighboring identical marks.

For example, to obtain the relationship between pulse width and reflectivity shown in FIG. 6C, each mark type was repeated 9 times in the test pattern T1, yielding a pattern of minimum length marks: 1,1,1,1, 1,1,1,1,1,1,2,2,2,2,2,2,2, 2, . . . .

Because the relationship between reflectivity and pulse width is approximately proportional for a range of pulse widths, a "stair-step" pattern of reflectivity results from a sequential scan of pulse width. For each repeated group of 9 marks, the mean and variance of the center mark of the group is measured and passed to the algorithm for placing the levels.

Test pattern T2 (4,0,4,9,10,1,11,12,5,14,4,8,3,13,2,7,6) is an alternate test pattern that contains less low-frequency signal power than pattern T1. It is generated by re-arranging test pattern T1 such that there is less low frequency spectral content. In general, DC balanced patterns are necessary for other sub-systems to successfully AC-couple to the RF output signal from the disc. For example, without proper DC control, data could contain a large frequency component that matches a resonance in the tracking or focusing lens servo. Cross-talk from the data path could then cause these servo loops to behave unpredictably resulting in poor data quality or a loss of tracking. On the data side, proper recovery of multi-level (ML) data with no DC control requires the read channel gain to be constant all the way down to DC. As a result, poor ML signal quality would result from AC-coupling to the read signal.

Other patterns are also used to initialize the write strategy matrix in other embodiments. The patterns described as examples above illustrate several advantages that are preferred in other patterns that may be selected. The full range of reflectivity is probed because the pattern varies from a level that does not substantially affect the media to a level that saturates the media. The effects of ISI are controlled by repeating each mark in the pattern. Statistics are measured for the output produced and DC and low frequency control is implemented.

Because different combinations of multilevel symbols contribute differently to nonlinear ISI, type-II test patterns are designed such that they contain all possible combinations of subsequences of multilevel symbols of a certain length. For efficient use of recording space and computation time, the test pattern is designed to have minimal length. For writing and reading servo stability, it is desirable to design the sequence such that it has no strong spectral components at low frequencies.

A well known class of sequences called "deBruijn sequences" have the desirable property that given a sequence of symbols from an 'm' letter alphabet, all 'k-tuples' occur in one cycle of the sequence. In the discussion below, an "m×k" sequence is a sequence which presents all possible k-tuples in an m-letter alphabet. The deBruijn sequence achieves this property with minimal length (i.e. no other sequence has a shorter length). Given that the deBruijn parameters m and n specify the size of the deBruijn sequence, there are multiple distinct deBruijn sequences with this above property. By varying the 'seed' of the deBruijn sequence generator, low frequency spectral components of the sequence can be minimized.

In one embodiment, for a write compensation system that maps sets of 3 input symbols (triplets) to the write strategy parameters, an 8×5 deBruijn sequence that efficiently explores all possible quintuplets of an 8 symbol set is used as a type-II pattern. For a write compensation system that maps triplets to the write strategy parameters, a repeating 8×3 deBruijn sequence may also be used. The advantage of the 8×5 sequence is that the effects of the next-nearest neighbors can be explicitly averaged.

In another embodiment, the type-II pattern is generated using the shift register sequences described in U.S. patent application Ser. No. 09/496,387, filed Feb. 2, 2000, entitled "Generating A Multilevel Calibration Sequence For Precompensation", now U.S. Pat. No. 6,604,219, issued Aug. 5, 2003. The shift register sequences are easier to generate in some cases than the deBruijn sequences. In some embodiments, the type 1 and type 2 patterns may be altered to reduce low frequency signal content as is described in U.S. patent application Ser. No. 09/496,897, filed Feb. 2, 2000, entitled "DC Control Of A Multilevel Signal", now U.S. Pat. No. 6,608,807, issued Aug. 19, 2003. In another embodiment, a random or pseudo-random sequence of data is used and a DC control algorithm is applied to the sequence. The length is chosen to be sufficient such that all subsequences of interest are sampled with adequate statistics.

Write Channel

Figure 4A:
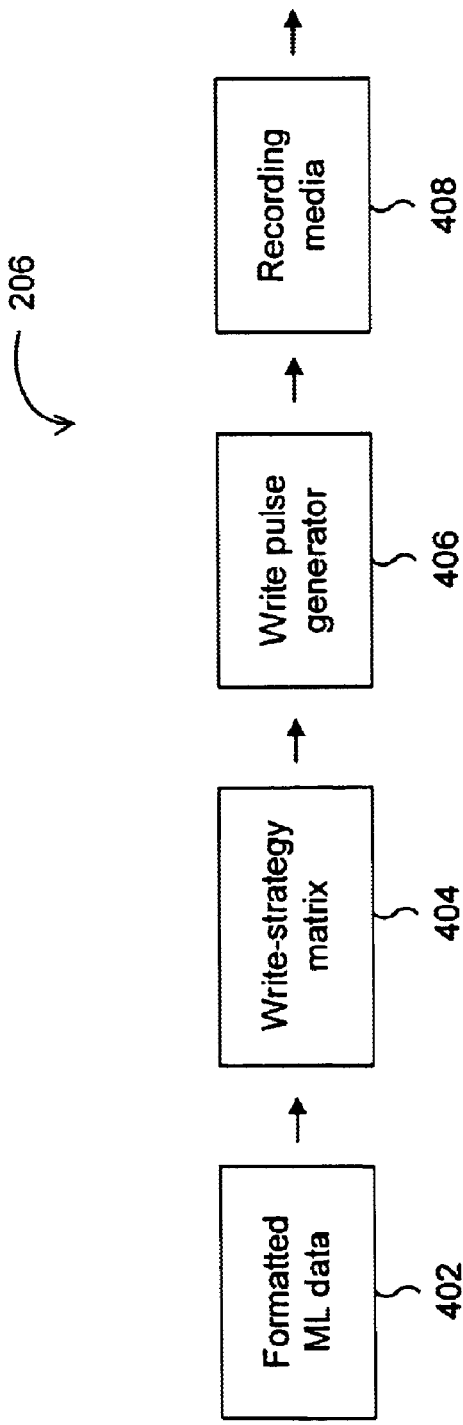
FIG. 4A is a block diagram illustrating in further detail Writer 206 shown in FIG. 2.

FIG. 4A is a block diagram illustrating in further detail Writer 206 shown in FIG. 2. Formatted ML data is input to the write strategy matrix 404. Write strategy matrix 404 maps the data to one or more write strategy parameters. Based on the write strategy parameters, the write pulse generator 406 modulates the precise time course of the laser that is incident on recording media 408. By applying a sliding window to the formatted ML data, subsequences of length m are sequentially selected that index write strategy matrix elements which, in turn, provide instructions to the write pulse generator. The reflectivity of the resulting ML marks on recording media 408 is then recovered by the reader and further processed.

The central set of laser control instructions are contained in the write strategy matrix (WSM). This matrix provides a method for indexing the detailed laser pulse generating instructions based on short sequential ML sequences. In the example illustrated, the length of the ML sequences is three marks (referred to as a triplet), where the center value represents the type of mark currently being written and the first and third values represent the preceding and following marks respectively. By using an index that includes the neighboring marks in the write strategy matrix, it is possible to shape the recovered signal to a particular target. As discussed above, this target is usually chosen to be a linear transformation of the input sequence. Larger indexing sequences are used in other embodiments to compensate for longer-range interference effects. However, longer indexing sequences require exponentially more memory and data to calculate the write strategy matrix.

As described above, in one embodiment, triplets are used in the write strategy matrix, and the write strategy parameters for each triplet are derived by averaging initialization data that includes all possible sequences of 5 input symbols. Thus, the write strategy parameters defined for each triplet are actually an average of the best write strategy parameters for all possible sequences of 5 that include the triplet in the middle.

Figure 4B:
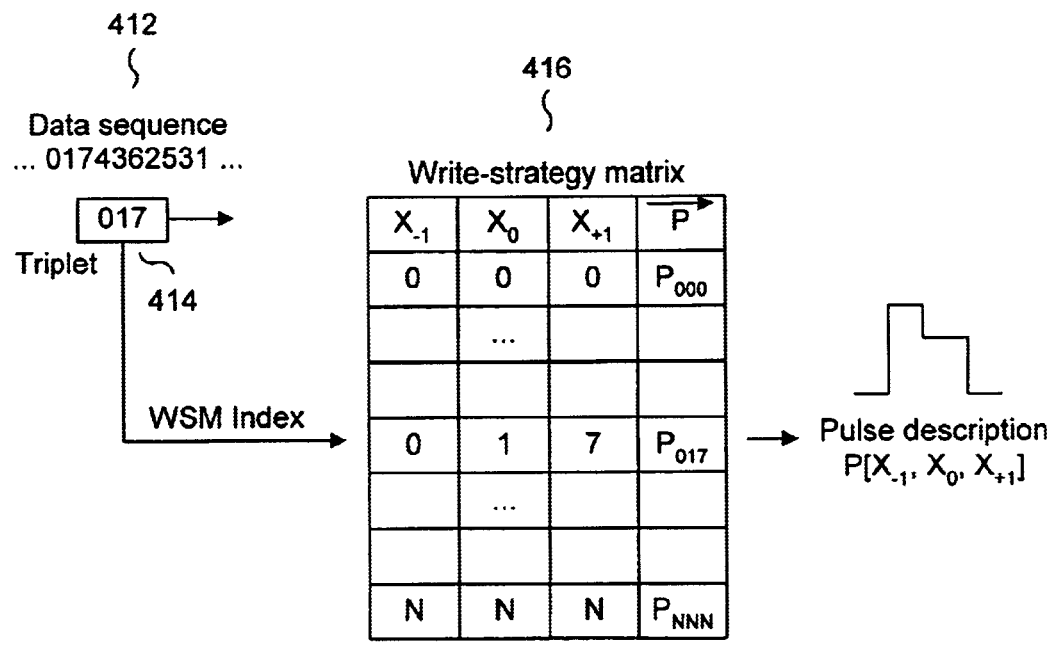
FIG. 4B is a diagram illustrating how the write strategy matrix is used to look up successive write strategy parameters for a ML data sequence in one embodiment.

FIG. 4B is a diagram illustrating how the write strategy matrix is used to look up successive write strategy parameters for a ML data sequence in one embodiment. A long ML data sequence 412 contains encoded data or test patterns. This data sequence can be represented as a string of integer values that range from zero to m−1, where m is the number of discrete levels in the ML system. A data pointer 414 into sequence 412 locates the mark to be written to the recording medium. After each tick of the write clock, the pointer moves to the next data position and locates the next sequence of marks to be recorded. The next sequence of marks in the example shown is 017.

The subsequence that is selected by the sequentially moving data pointer is used as an index into write strategy matrix 416. In the example shown, the data pointer points to the center of the triplet 017. In other embodiments, other subsequence reference points are used. For example, if nonlinear effects that are targeted for removal by the write compensation procedure are mostly due to the marks written prior to the current mark, it may be advantageous to reference to the beginning or end of the sub-sequence. As the data pointer moves sequentially through the sequence, the subsequence changes accordingly and is used as the index into the write strategy matrix for retrieval of the laser control instructions.

In the following discussion, the sub-sequence is assumed to have a length of three and functions as an index into the write strategy matrix. As mentioned above, index lengths other than triplets are used in other embodiments.

In one embodiment, write strategy matrix 416 may be implemented simply as a table of values. The size of this matrix is N×M where N=n_params is the number of write strategy parameters (usually one) being used to control the mark reflectivity and $M=m^{n\_index}$ is the total number of unique indices with length n_index for a multi-level code with m levels.

In certain embodiments, some write strategy parameters may vary on a mark by mark basis while others vary more slowly. In such a case, there may be one entry for each of the write strategy parameters that is being varied on a mark by mark basis and the other write strategy parameters that may be varied slowly (i.e. power control) are stored separately from the write strategy matrix. This may reduce the size of the memory needed to implement the write compensation.

Note that if a recording system is designed to compensate for inter-symbol-interference that extends beyond nearest neighbors, the write strategy matrix increases in size in order to compensate for this ISI. For example, a write compensation system that corrects for effects due to next-nearest neighbors, increases by a factor $m^2$, where m is the size of the multi-level alphabet.

The order of the M matrix elements is designed to correspond to the method of indexing the write strategy matrix. In one embodiment, n_params=1, n_index=3, m=8, and $x_{-1}$, $x_0$, $x_{+1}$ contain the previous, current, and future mark types to be written at a particular instant in time. In this embodiment, the write strategy matrix can be represented by $8^3$=512 numbers ordered in such a way that each possible mark triplet [$x_{-1}$, $x_0$, $x_{+1}$] locates a unique position in the write strategy matrix.

For each tick of the write clock, the data pointer is incremented and a sub-sequence is extracted from the data sequence and used as an index into the write strategy matrix. For an index consisting of a triplet in an 8-level system, one of 512 possible write strategy parameters is indexed by the triplet. This parameter, or set of parameters, is then sent to the write pulse generator, which then generates the pulse sequences that control the laser power delivered to the disc recording medium.

Figure 4C:
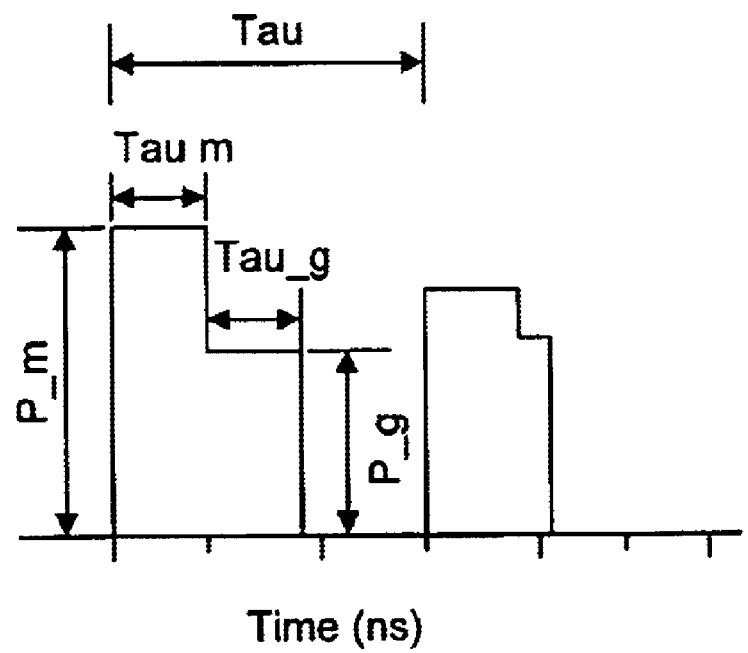
FIG. 4C is a diagram illustrating a write strategy that uses a pulse having a variable power.

FIG. 4C is a diagram illustrating a write strategy that uses a pulse having a variable power. The pulse power is varied so that the shape of a mark within a cell is varied. The pulse type illustrated in FIG. 4C is defined by five parameters: Tau, Tau_g, Tau_m, P_g and P_m. In the example shown, the pulse begins with maximum power P_m and continues for a duration Tau_m at maximum power. Then, the pulse transitions to an intermediate power level P_g for a time Tau_g. After interval Tau_g, the pulse ends. As with all of the described write strategies, when the pulse ends, the power may either be zero power or a biasing power. Varying the power during a pulse changes the shape of a mark written by the pulse. In one embodiment, lowering the power in the middle of a pulse decreases the size of the amorphous mark by promoting the growth of crystalline material beginning at the outside boundary of the mark. This growth can be precisely controlled by varying Tau_g. A short Tau_g results in a large amorphous mark and low reflectivity while a long Tau_g results in a small amorphous mark and high reflectivity.

In one embodiment, the write strategy parameters Tau, Tau_m, P_m and P_g are fixed or slowly varying and the parameter Tau_g varies on a mark by mark basis as specified by the write strategy matrix. In other embodiments, other parameters or sets of parameters can be varied based on the write strategy matrix.

The structure of the write strategy matrix is general purpose and can be applied to other write strategies without loss of function. The write strategies contained in U.S. patent application Ser. No. 09/373,916, filed Aug. 12, 1999, entitled "High Density Data Write Strategy" which is herein incorporated by reference, hereinafter O'Neill et. al. are shown as examples only. The write compensation algorithm described here can be applied to write strategies and write strategy parameters other than the ones mentioned as examples.

The write pulse generator of FIG. 4A can utilize various techniques for controlling the laser power. The laser power may be modulated or the laser may be pulsed with the pulse duration of the laser being varied, or both the pulse power and the pulse duration may be varied. The laser power may be modulated directly or by varying the amount of laser light that passes through a light modulator. Also, the time that the laser irradiates a portion of the disc may be varied by changing the rate of rotation of the disc. All of these factors may be controlled by one or more write strategy parameters determined by the write strategy matrix.

In one embodiment, a fully programmable write laser control signal is generated using a multiplexer that selects inputs from different delay lines for the purpose of precisely adjusting the timing of write signal transitions derived from the multiplexer output such as is described in U.S. patent application Ser. No. 09/393,208, filed Sep. 9, 1999, entitled "Programmable Write Signal Generator", now U.S. Pat. No. 6,269,060, issued Jul. 13, 2001, which is herein incorporated by reference. The delay lines may be obtained by using one or more delay lock loops referenced to an external clock to derive delay control voltages for delay cells. The delays produced by the delay cells are precisely defined fractions of the external clock period and are independent of fluctuation in temperature or power supply voltage. The derived delay voltages are input to delay stages to precisely generate delays for the input delay lines. The delay line corresponding to the exact desired delay can be selected by the multiplexer.

It should be understood that other suitable methods of generating a laser write control signal may be used to generate write signals according to the strategies disclosed herein. The write strategies disclosed herein may be used with any available technique for generating the specified write signals.

Read Channel

Figure 5:
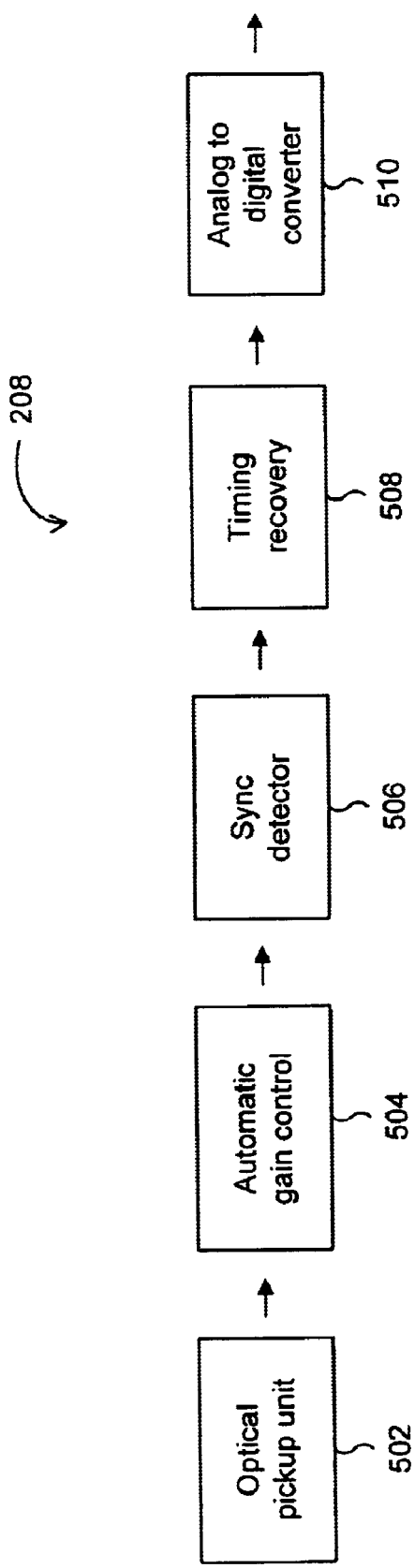
FIG. 5 is a diagram illustrating in further detail reader 208 shown in FIG. 2.

FIG. 5 is a diagram illustrating in further detail reader 208 shown in FIG. 2. It is at this processing stage that many of the inserted formatting sequences are used. The read channel front-end samples the voltage representing the disc reflectivity such that the data is protected from the effects of noise and sampling errors.

An optical pickup unit (OPU) 502 measures the reflection of a reading laser from a disc. In one embodiment, a reading laser is focused to a diffraction limited spot and the resulting reflected light is measured by OPU 502. An automatic gain control (AGC) system 504 then uses the previously inserted AGC sequence to control the signal strength and bias to protect the ML data against corruption from low-frequency noise. An anti-aliasing filter (not shown) may protect the data from corruption from high-frequency noise. Sync marks detected by sync detector 506 and the accompanying timing recovery detected by timing recovery system 508 protect the data sampling from timing errors. In one embodiment, timing recovery is assisted by using a special sequence to determine a zero time. This sequence consists of a short pseudo-noise sequence that has a well-behaved auto-correlation property. This property of the sequence is used to precisely locate the beginning of a data block adjacent to the sequence.

Ideally, a write compensation system causes an output from the read channel front-end such that a subsequent equalizer can remove all the remaining linear ISI. In one embodiment, the data from the read channel front-end is sent to an adaptive fractionally-spaced-equalizer (FSE) during normal operation which removes all linear ISI before sending the data to the de-formatter and decoder. In other embodiments, other types of equalizers are used. The FSE takes the data sampled at twice the mark rate and equalizes it to a "memory-less" (no ISI) channel. The equalization is performed by an N_tap asymmetric finite-impulse-response (FIR) filter, whose taps are adapted by a tap-update-processor (TUP). These filter taps are specified at the sample rate, which is half the output, or mark rate. The FSE takes its data input from the reader front-end by way of a FIFO buffer. The FIFO is filled by the reader, and the FSE starts extracting from the FIFO when the TUP is finished. The updates to the filter taps are calculated by the TUP using an adaptation sequence that is part of the data format. Note that the write compensation system receives its input from the reader front-end and not from the output of the equalizer.

Channel Model

The data generator sends data to the write strategy calculator (WSC) in two parallel pathways: 1) Passing through the physical channel (writer and reader), and 2) Passing through a mathematical model of the channel. The purpose of the write strategy calculator is to make the output of these two pathways match by adjusting the elements of the write strategy matrix (which contains the precise laser control instructions for creating ML marks). The channel model provides a target for the write strategy calculator that makes the relationship between the input data and recovered output simple and as well-behaved as possible.

There are two types of channel models considered in detail here: 1) Fixed models and 2) Dynamic models. Fixed models of the channel do not change during the write compensation procedure and do not need additional information from the write strategy calculator. Dynamic models change during the write compensation procedure based on information provided by the write strategy calculator. In one embodiment, the channel model is linear and dynamic. Other dynamic channel models can be either linear or nonlinear.

Two choices for the fixed channel models include the "1+D" model and the "1+$\alpha$D+D$^2$" model, where D is the delay operator and $\alpha$ is a fixed constant. These model choices have applications in the design of band-limited channels where a controlled amount of ISI is desired. The ability to shape the channel with write compensation such that the channel has a controlled amount of ISI is particularly useful when used with Viterbi detection in Partial Response Maximum Likelihood (PRML) reception. These channel models are relatively simple to implement and calculate. More complicated linear models include the "matched filter" model which shapes the data such that the system SNR is a constant value at all frequencies, and a "best-fit" model which shapes the data with a linear filter that is closest to the physical channel output in the least-squared-error sense.

Dynamic models may be either constrained or general. An example of a constrained dynamic model is the "1+$\alpha$D+D$^2$" model where $\alpha$ is a parameter that may vary during the write compensation procedure. The write compensation procedure begins with an initial guess for the write strategy matrix. The data is then written and recovered. A new value of the parameter $\alpha$ is calculated such that the channel model 1+$\alpha$D+D$^2$ minimizes the summed-squared difference between the channel model output and the physical channel output. This new value of the channel model parameter is fed back to the channel model for the write strategy matrix update computation. The recovered data is then compared to the channel model using the new value of $\alpha$, and an update to the write strategy matrix is computed.

A general linear dynamic model is similar to the above constrained dynamic model but without the forced constraints on the structure of the linear filter. In a system with an adaptive equalizer, is it more important to shape the channel to be linear than to shape the channel to a particular linear target. Linear distortions of the data are removed by the equalizer, while nonlinear distortions are not.

As in the above example, the write compensation procedure begins with an initial guess for the write strategy matrix, with which a type-II test pattern is written and recovered. A new set of taps for the channel model's FIR filter is calculated such that the new filter coefficients (i.e. kernels $h_0$ and $h_1(\tau)$) minimize the summed squared difference between the channel model output and the physical channel output. This new set of tap values is fed back to the channel model for the computation of the update to the write strategy matrix elements. The difference between the recovered data and the new channel model is calculated and the resulting error sequence is used to update the elements of the write strategy matrix. If the summed-squared difference between the recovered data and the channel model is not less than a specified error value, the procedure iterates beginning with a write of the type-II test pattern using the updated write strategy matrix.

In one embodiment, an adaptive FSE is included between the reader front-end and the decoder. The equalization is performed by a multiple tap finite-impulse-response (FIR) filter, whose taps are adapted by a tap-update-processor (TUP). As a result, the number of filter taps available to restore the original data is constrained. If the channel model contains more taps or complexity than the FSE then it is possible to create a condition where an inverse filter cannot be constructed to undo the effective linear transform performed by the system on the original data.

In other embodiments, it is desirable to have a controlled amount of ISI for PRML reception. In such an application of the write compensation system, particular forms of the target (e.g. 1+D or 1+$\alpha$D+D$^2$) are desired.

Write Strategy Calculator

The write strategy calculator determines a set of write strategy parameters that correspond to input data subsequences. The write strategy parameters determine laser control instructions such that the relationship between the input data sequence and the recovered data is close to the specified target. As mentioned above, the target may be either fixed or dynamic. In addition to this function, the write strategy calculator must perform a number of supporting operations including write strategy matrix initialization, data alignment, and determining when and how to exit the write compensation procedure.

The write strategy calculator receives data from two sources: 1) The reader output and 2) The channel model output. The correspondence and alignment of these two data sequences is determined by the write strategy calculator in one of the first data processing steps of the write compensation procedure. The write strategy calculator also transmits data back to two sources: 1) The write strategy matrix and 2) The channel model.

FIG. 6A is a diagram illustrating in further detail write strategy calculator 214 shown in FIG. 2. The write strategy calculator begins the write compensation procedure by initializing the write strategy matrix and channel model. After initialization is complete, data (of type-II pattern) is recorded. Data from the two sources (reader and model) is then loaded into a buffer 602 and pattern aligner 604 aligns the two sequences such that their cross-correlation is peaked with zero delay. In other embodiments, a large buffer is not used and the data alignment is performed by synchronizing the channel model output with the reader output by triggering on "start-of-pattern" formatting sequence. Once the target and recovered data are aligned, the difference between the two sequences is calculated by Error Calculator 606 and fed to write strategy matrix Updater 608. Write strategy matrix updater 608 uses the resulting error sequence to compute new write strategy matrix elements that minimize the error. Once the error is less than a specified value, the write compensation procedure terminates. In a system with a dynamic channel, the output of Pattern aligner 604 is also input to a Target channel model updater 610. Target channel model updater 610 updates the target channel model within the constraints imposed on the target channel model to decrease the difference between the read signal and the target channel model. In some embodiments, the difference calculated by Error Calculator 606 is input to target channel model updater 610 so that it is used both by the write strategy matrix updater and the channel model updater.

Figure 6D:
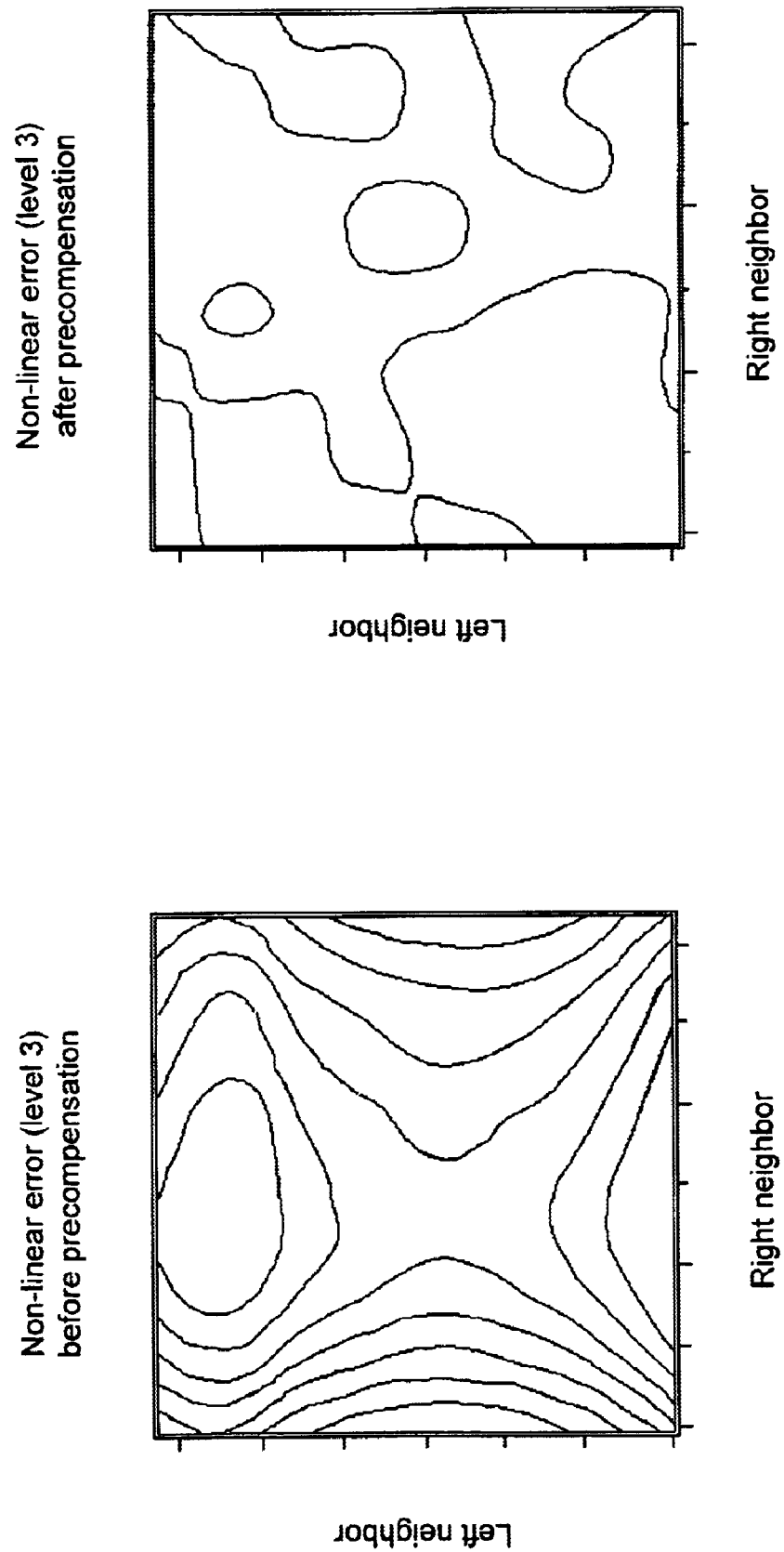
FIG. 6D is a sample contour plot illustrating systematic signal error for a level 3 symbol as a function of its two nearest neighbors before and after precompensation.

FIG. 6D is a sample contour plot illustrating systematic signal error for a level 3 symbol as a function of its two nearest neighbors before and after precompensation. As the write strategy calculator updates the write strategy matrix, the total error is decreased and the distribution of the error is flattened.

In the study of numerical methods, algorithms are generally classified as direct or iterative. In one embodiment, the method of computing a final write strategy matrix is a combination of direct and iterative methods in that it is an iterative improvement to a direct calculation. The direct calculation is discussed in the initialization section, and the iterative calculation is discussed in the subsequent iteration and control section.

In the following discussion of write strategy matrix initialization methods, three methods named: "Diagonal", "Software-Iteration", and "Pre-existing" are presented. Each method differs in the test pattern used in the initialization calculation as well as the algorithm. The generation of the "Diagonal write strategy matrix" uses type-I test patterns, the "Software Iteration write strategy matrix" uses type-II test patterns, and the "Pre-existing write strategy matrix" uses no test pattern (because it is based on scaling a pre-determined write strategy matrix). The initialization process influences how fast the write compensation procedure converges. If the initial write strategy matrix is close to the final write strategy matrix, the procedure converges faster.

In a multi-level recording system using M multiple levels of reflectivity to encode information, the write strategy matrix initialization includes picking an initial set of M target levels and the coupled write strategy parameters. Two criteria that may be used to place the target levels are:

1) Equally-spaced level criteria, or "ELC" and
2) Constant Discriminability Criteria, or "CDC".

In different embodiments, these criteria or combinations of these criteria are used. Other criteria may also be used in other embodiments.

The CDC level placement strategy uses measurements of both the average and variance of the mark reflectivity. The shape of the nonlinear curve in FIG. 6B is typical of the response of recording media used in several embodiments. The solid curve plots average reflectivity as a function of a write strategy parameter. The four points labeled A–D represent four possible level placements. The variance of the level reflectivity for each of these four points is represented by the probability distributions on the right side of the plot. The initial set of levels are chosen based on the measurement of the relationship between the mark reflectivity and the write strategy parameters as well as the variance of the sampled reflectivity.

Once the relationship between the write strategy parameter and the reflectivity is measured, the maximum and minimum values of reflectivity are determined (points $R_{max}$ and $R_{min}$). Two new points X and Y are defined by moving up from the minimum reflectivity (point Y) and down from the maximum reflectivity (point X) by a small fraction (in one embodiment about 10%) of the full dynamic range ($R_{max}-R_{min}$). A "working" dynamic range $DR_w$ is defined by these two new points: $DR_w=X-Y$. This working dynamic range is smaller than the full DR ($R_{max}-R_{min}$) to allow the write compensation procedure to adjust the points of maximum and minimum reflectivity either up or down.

The criteria for placing the levels such that the difference between neighboring levels m and n are constant ($\Delta L_{mn}$=constant) is named ELC, or Equally-spaced Level Criteria. The initial level placement is performed by dividing up the working dynamic range into equally spaced reflectivity levels, or $\Delta L_{mn}$=constant. Because the relationship between reflectivity and write strategy parameter is generally nonlinear, spacing the levels of reflectivity equally usually results in non-equally spaced write strategy parameters. An example of four equally spaced levels and their associated level distributions is shown in FIG. 6B.

The criteria for placing the levels such that the errors made discriminating between all neighboring levels is equal is named CDC, or Constant Discriminability Criteria. The criteria assumes that the level distribution is approximately Gaussian with standard deviation $\sigma_m$ and places the levels $L_m$ such that the difference between neighboring mean levels $\Delta L_{mn}=L_m-L_n$ satisfies equation (2) below.

$$\Delta L_{mn} / \sqrt{(\sigma_m^2 + \sigma_n^2)/2} = \text{const} \tag{2}$$

The upper and lower most levels are chosen to span the full working dynamic range. With this criteria, the overlap of the tails of all neighboring Gaussian level distributions are equal. Because the overlap of the distributions corresponds to errors an optimal level discriminator would make, the total number of errors can be minimized by adjusting the placement of the average levels such that the overlap from all neighboring level distributions are of equal amount.

Figure 7:
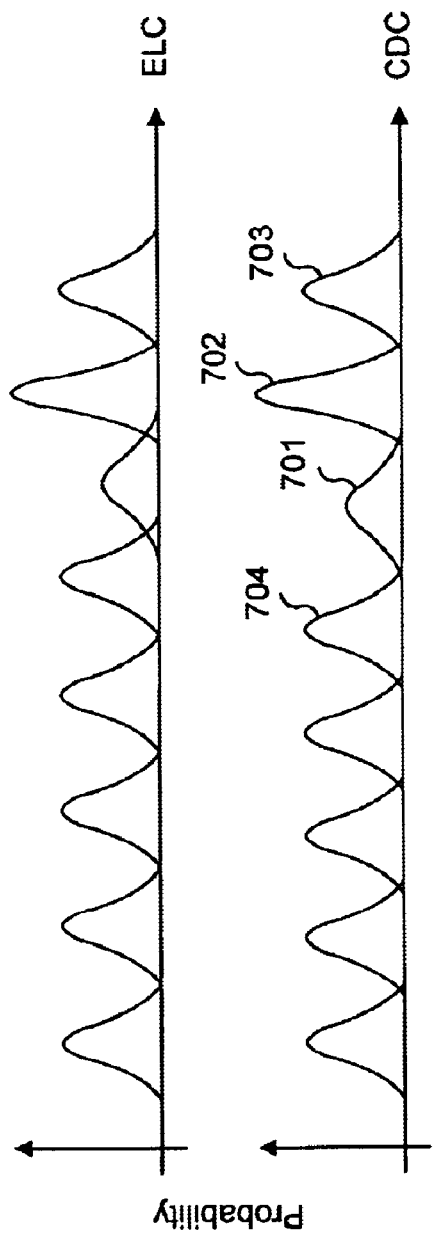
FIG. 7 illustrates an 8-level system where there is one narrow and one wide distribution.

FIG. 7 illustrates an 8-level system where there is one narrow and one wide distribution. Both ELC and CDC levels are shown. The total number of symbol errors that would be made for such a signal set is represented by the total overlap of all the distributions. The total overlap can be reduced by placing the levels according to equation (2) above. When the levels are so placed, levels 701 and 703 that neighbor narrow distribution 702 are shifted toward narrow distribution 702 and levels 702 and 704 that neighbor broad distribution 701 are shifted away from broad distribution 701.

Once the CDC levels are determined, a level placement matrix (LPM) is constructed. During the write compensation procedure, the LPM functions as a look-up table that converts the integer test patterns into new target values for input to the channel model. Note that the LPM for ELC level placement represents a simple linear relationship.

In one embodiment, the initial write strategy matrix is determined using reflectivity measurements of a type-I test pattern containing a series of repeated marks. In the context of a write strategy matrix index length of three, the "Diagonal write strategy matrix" gets its name because an arbitrary element (i, j, k) in the write strategy matrix is approximated by the "diagonal" term (j,j,j). In this embodiment, the type-I staircase pattern is recorded and read back many times in order to gain a good estimate of both the mean and variance of the reader signal. Because the repeated marks of the type-I patterns correspond to "diagonal" elements (j,j,j) of the write strategy matrix, these elements of the write strategy matrix are the ones most closely represented by this method. Arbitrary elements (i,j,k) of the write strategy matrix are then approximated with their nearest diagonal element, (j,j,j).

In the type-I pattern, each "stair step" corresponds to multiple sequential marks created with identical write strategy parameters. The length of each sequence of identical marks is long enough such that sampling the middle of this sequence has almost no dependence on the neighboring steps. The range of the WS parameters used to create the different stair steps is chosen to extend beyond the range anticipated for encoding actual data. This is done to allow good definition of the points of saturation. As shown in FIGS. 6B and 6C, the working dynamic range is defined by reducing somewhat the full dynamic range detected during initialization.

After the staircase pattern is read, the data is synchronized and re-sampled to eliminate effects of read speed variability, and re-scaled to compensate for any slowly varying amplitude shifts. Different repetitions of the pattern are averaged to produce a relationship of the reflectivity mean and variance as a function of WS parameter value similar to FIG. 6B. If a particular reflectivity level choice for either initial level placement method ELC, or CDC is not directly sampled by the type-I pattern, the expected mean and variance values are interpolated using neighboring points.

It is worth noting that type-I patterns produce a reader signal which resembles a "staircase". When viewed on an analog scope, these test patterns dwell on a series of level values for a time that is much longer than the time it takes to transition to the next level. As a result, the persistence time of the oscilloscope features the level plateaus and dims the transitions. The result is multi-level version of the well-known EFM "eye-diagram". This ML eye diagram provides an efficient method of estimating the level placement and variance.

The Software Iteration write strategy matrix provides a means for modeling the physical channel through interpolating an expected channel response based on repeated measurements of type-II patterns. As discussed above, these type-II test patterns present all possible combinations of subsequences of multilevel symbols of a certain length. Using this pattern, the mean reflectivity for each index sequence is calculated and stored in the Software Iteration write strategy matrix as a coupled element of mean reflectivity and write strategy parameter. Whereas the standard write strategy matrix contains only an indexed set of write strategy parameters, the Software Iteration write strategy matrix includes in addition to the write strategy parameter, a mean reflectivity for each index sequence.

The Software Iteration write strategy matrix can be used as a model of the channel for the purpose of doing further iterations to update the write strategy matrix. Since the Software Iteration write strategy matrix includes a mean reflectivity for each input subsequence, simulated write and read can be executed by interpolating the indices of the write strategy matrix and determining the expected reflectivity. In one embodiment, a real write and read is executed for the purpose of updating the Software Iteration write strategy matrix and then the Software Iteration write strategy matrix is used to execute one or more simulated writes and reads. Another real write and read is then executed to update the Software Iteration write strategy matrix. The convergence of the write strategy matrix to an acceptable write strategy matrix can be quickened significantly by this technique since a simulated write and read using the Software Iteration write strategy matrix can be executed faster than a real write and read.

The Software Iteration write strategy matrix model differs from the target channel model discussed above. The target channel model is used as the target of the write compensation of the system, and is not necessarily an accurate model of the uncompensated channel. The determination of the write strategy matrix attempts to cause the write compensated channel to match the target channel model. In contrast, the Software Iteration write strategy matrix model simulates the current behavior of the compensated channel using current write strategy matrix values. It allows simulated writes and reads to be executed for the purpose of adjusting the write strategy matrix values to cause the compensated channel to more closely conform to the channel target. Simulated writes and reads are combined with real writes and reads in a manner that causes the write strategy matrix to converge to an acceptable write strategy matrix in an efficient manner.

When a type-II test pattern is passed through both the channel model and the Software Iteration write strategy matrix, the difference between these two signals is used to generate an update to the write strategy parameters of the Software Iteration write strategy matrix. Based on the changes made to the write strategy parameters, the associated reflectivity values are interpolated to a new set of expected reflectivity values. This procedure iterates until the mean-squared-difference between the channel model and the Software Iteration write strategy matrix is less than a specified value.

The write compensation procedure using the Software Iteration write strategy matrix is thus similar to the procedure using the standard-write strategy matrix. Instead of writing and reading out a test pattern to the storage system for every iteration, the Software Iteration write strategy matrix is re-interpolated to list the new set of write strategy parameters. In this way, writing to and reading from the storage system is replaced by interpolation of the Software Iteration write strategy matrix.

A pre-existing write strategy matrix is the result of a converged iteration procedure. By using a pre-existing write strategy matrix as a starting point for iterations, the convergence process may be shortened. If it is determined that an overall system change has occurred in the system, the pre-existing write strategy matrix can be re-scaled or re-interpolated to compensate for the change in the system. Examples of systematic changes include changing or optimizing the dynamic range, changing writing laser power, changing spot size (i.e. de-focus), or changing media type.

The write strategy calculator (write strategy calculator) is made from four "sub-calculators": 1) Pattern aligner, 2) Channel model updater, 3) Error calculator, and 4) write strategy matrix updater. The write strategy calculator receives data from both the channel model and the read channel and it sends data to both the channel model and the write channel.

In one embodiment, the write strategy calculator receives simultaneous type-II pattern data from both the channel model and the read channel output and stores these data streams in separate buffers. In other embodiments, the output of an "Software Iteration write strategy matrix" may substitute for the read channel source. The start of the type-II pattern is marked in each buffer by a pointer and passed to the channel model calculator. If necessary, the channel model is updated, the buffer pointers are reset, and the pointers to the beginning of buffer A and B are sent to the error calculator. The output of the error calculator is a matrix of average differences between the target and recovered value for each n-tuplet (usually triplets). This error matrix is then passed to the write strategy matrix updater which calculates new write strategy parameters.

In other embodiments which utilize a fixed channel model, other pattern alignment and memory management methods may be used to generate the error matrix. For example, the buffers described above may be replaced by FIFO buffers of length n_index (usually three) by synchronizing the output of the channel model with the read channel output. This synchronization may be performed by detecting a special timing sequence such as the TZL sequence that locates the beginning of the pattern. Once detected, the FIFO buffers are filled and the error calculation is instructed to begin. The error for each n-tuple (usually a triplet) is then directly accumulated into the error matrix.

In one embodiment, the entire formatted type-II pattern is passed through the level placement matrix (LPM) and loaded into a buffer_A. Because the type-II pattern is internally generated, a pointer to the beginning of the type-II pattern in buffer_A can be set by construction. The sampled output of the read-channel front end is then loaded into a buffer_B. In some embodiments, the read data may be sampled at a rate other that than the data cell frequency. In such a case, the size of buffer_B is scaled accordingly. A pointer into buffer_B is subsequently set to point to the beginning of the type-II pattern by locating a timing-zero-locator (TZL) sequence. As discussed above, this sequence is a pseudo-random sequence that can be used by a circuit or algorithm to locate the beginning of a formatted block of data containing the type-II pattern. In other embodiments, the output of an "Software Iteration write strategy matrix" may substitute for the read channel source.

In one embodiment, buffer_B is Q times the length of buffer_A, where Q is the number of times the type-II sequence repeats. In the context of a write compensation system using triplets (n_index=3), different repeat lengths Q are used depending on the structure of the type-II sequence. For 8×3 sequence, a Q between 10 and 100 is sufficient, for an 8×5 sequence a Q between 1 and 10 is sufficient. The value Q is less for the 8×5 sequence because the next-nearest neighbors can be averaged over to contribute to a better estimate of the triplet.

At the completion of the alignment locator step: 1) Buffer_A is full of type-II data that has been re-mapped by the LPM, 2) Buffer_B is full of sampled read-channel data (or "Software Iteration write strategy matrix" data) and 3) Pointers to the beginning of the type-II pattern for both buffers A and B have been located and set.

The output of the pattern aligner (pointers to the beginning of the patterns in each of the filled buffers A and B) forms the input to the channel model updater. Upon entry into the channel model updater, the associated channel model parameters are loaded (e.g., number and values of the initial filter taps). The type of channel model (fixed or dynamic) determines the type of parameters that are loaded. No update to the channel model is necessary for fixed channel models, so a buffer_C containing the channel's target values is simply filled.

In one embodiment, a dynamic channel model consists of a n_tap FIR filter (i.e. kernels $h_0$ and $h_1(\tau)$ in equation (1)). The kernels (or set of taps) are calculated such that the new filter coefficients operating on the symbol set in buffer_A minimize the summed-squared difference between the channel model output and the physical channel output (buffer_B). After the channel model is calculated, buffer_C is then filled with the model values by passing the data from buffer_A through the channel model. Note that if multiple presentations of the type-II pattern are written and read using a fixed channel model, the model (or target) values in buffer_C need only to be loaded once.

At the completion of the channel model updater, an additional buffer_C containing the channel target values is filled and a pointer to the beginning of the pattern in buffer_C is set.

Upon entry into the error calculator block, buffer_B holds the sampled read channel data and buffer_C holds the target data. The input to the error calculator block consists of pointers into buffers B and C which locate the beginning of the type-II pattern.

For each triplet $[x_{n-1}, x_n, x_{n+1}]$, the average difference between the read channel output and the model's target value is accumulated in a write strategy error matrix (WSEM). The average difference between the read channel output and the model's target value is called the systematic error and is given the symbol $e_n$ in the discussion below. The structure of the WSEM is of the same form as the write strategy matrix but instead of storing the laser control instruction for each triplet, the systematic error for the center value of the triplet is stored. Note that if multiple presentations of the type-II pattern are loaded into buffer_B, buffer_C is treated as a cyclic buffer.

The input to the write strategy matrix updater consists of the write strategy matrix, WSEM, and a set of pre-determined parameters. The set of pre-determined parameters include a convergence factor for the iterative procedure and an array containing the average reflectivity as a function of the write strategy parameter (obtained earlier by the initialization block presenting the type-I pattern). This array is used to determine the sensitivity of the reflectivity to the WS parameter.

Through an iterative procedure, one embodiment of the write compensation system updates the laser control instructions in the write strategy matrix such that a specific data input results in a recorded output equal to the channel model output. In the context of a write compensation system with n_index=3, the update to the write strategy matrix can be represented as:

$$p^{(g+1)}(i,j,k) = p^{(g)}(i,j,k) + \Delta p(i,j,k) \qquad (3)$$

where $p^{(g)}(i,j,k)$ is the value of the WS parameter for the triplet $[i,j,k]$ on iteration number g and $\Delta p(i,j,k)$ is the incremental change made to this WS parameter.

There are two primary methods for updating the write strategy matrix: 1) sloped-based updates and 2) fixed updates. Three pieces of data are used for updating the write strategy matrix using the slope-based method: 1) a convergence factor 2) the media response curve and 3) the WSEM. The convergence factor $\lambda$ (typically in the range of 0.5 to 1.0) is used to regulate the magnitude of the write strategy matrix update such that the write compensation procedure converges to a stable value. The media response curve (reflectivity vs. WS parameter) can be obtained from the recording of the type-I pattern presented in the initialization step. Because the write strategy calculator measures the difference between the read channel output and the channel model output in units of reflectivity, the media response curve provides information to the write strategy calculator on how much reflectivity changes when a write strategy parameter is changed a given amount. The derivative of this curve can then be used to calculate the sensitivity $$\frac{\partial r_j}{\partial p_j}$$

of the reflectivity $r_j$ to the WS parameter $p_j$.

The change Δp made to WS parameter p(i,j,k) is estimated from equation (4) below:

$$\Delta p(i, j, k) \cong \lambda \frac{e(i, j, k)}{\left(\frac{\partial r_j}{\partial p_j}\right)} \quad (4)$$

where the error in reflectivity $e_n$ between the read channel output and the channel model output is obtained from the WSEM.

In another embodiment, the write strategy matrix may be updated using a small but fixed size Δp. Three pieces of data are needed prior to updating the write strategy matrix with this method: 1) The sign of $$\frac{\partial r_i}{\partial p_j},$$

the sign of the WSEM elements, and the size of the update step Δp. The direction of the step Δp is determined from the WSEM and the media response curve. The change made to WS parameter p(i,j,k) is thus $$\left[\Delta p * \text{sign}(e_n) * \text{sign}\left(\frac{\partial r_j}{\partial p_j}\right)\right].$$

In other embodiments the size of the step Δp may be varied from iteration to iteration such that the first iteration uses a larger step size than the subsequent iterations. Varying the step size as a function of the iteration number typically reduces the number of iterations necessary. However, compared to the above slope-based method, many more iterations are typically required to converge to a final write strategy matrix.

If the speed of reading and writing from the disc is the rate-limiting step for the write compensation procedure (vs. calculation speed in RAM), the speed of convergence can be improved by writing out multiple test patterns calculated using different convergence factors. In one embodiment, several values for λ (such as 0, 0.5, 0.75, and 1) are tried in parallel during each iteration, and the value which produces the lowest root-mean-square systematic error is used as the starting point for the subsequent iteration.

In one embodiment, if the summed-squared error of the WSEM is less than a specified threshold value, the write strategy calculator exits the write compensation procedure with a final write strategy matrix. If a large number of iterations occur with no procedure exit, an error is indicated and a recovery strategy is executed.

Write Compensation Procedure

Figure 8A:
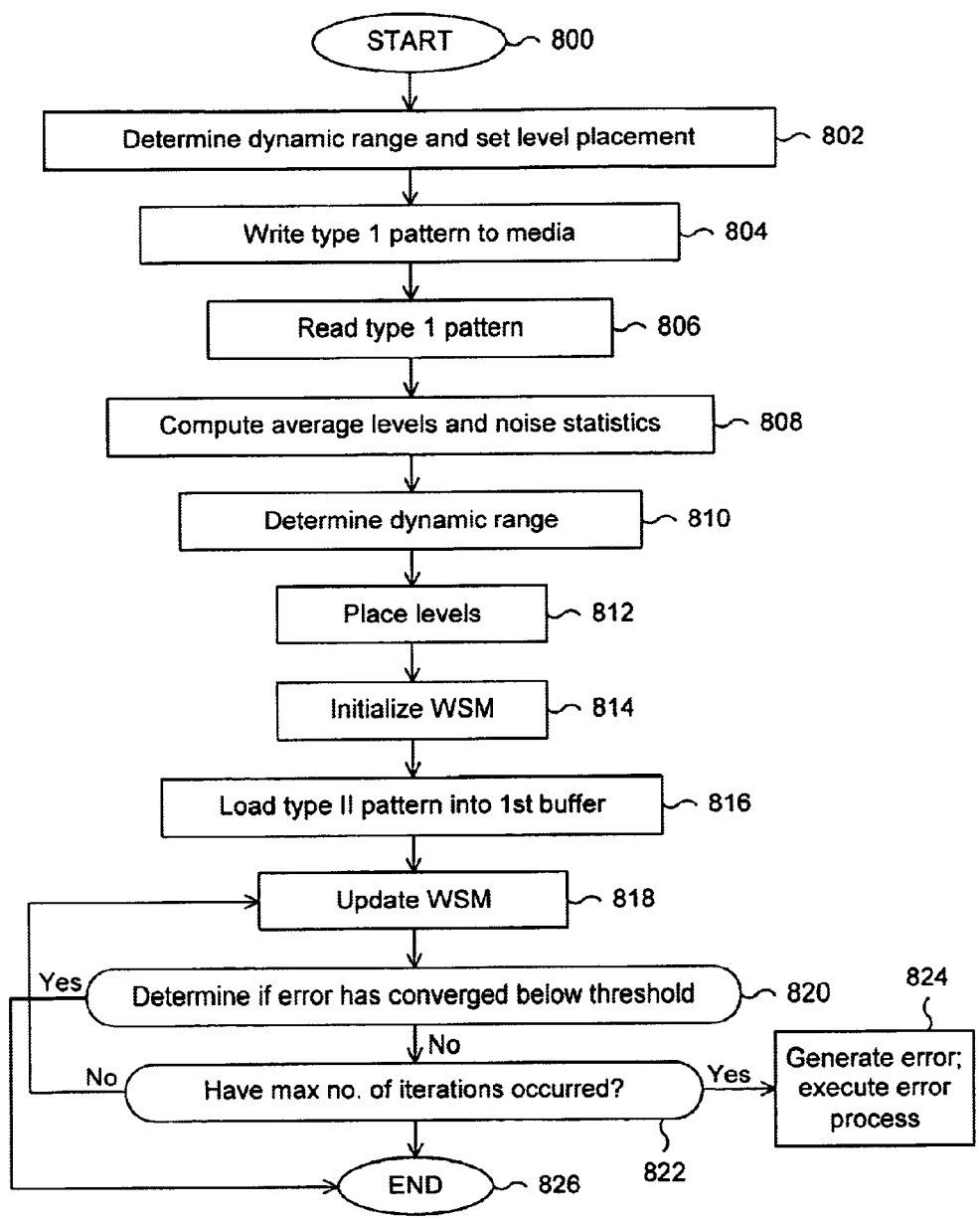
FIGS. 8A and 8B illustrate the write compensation process used in one embodiment and described in detail above.
Figure 8B:
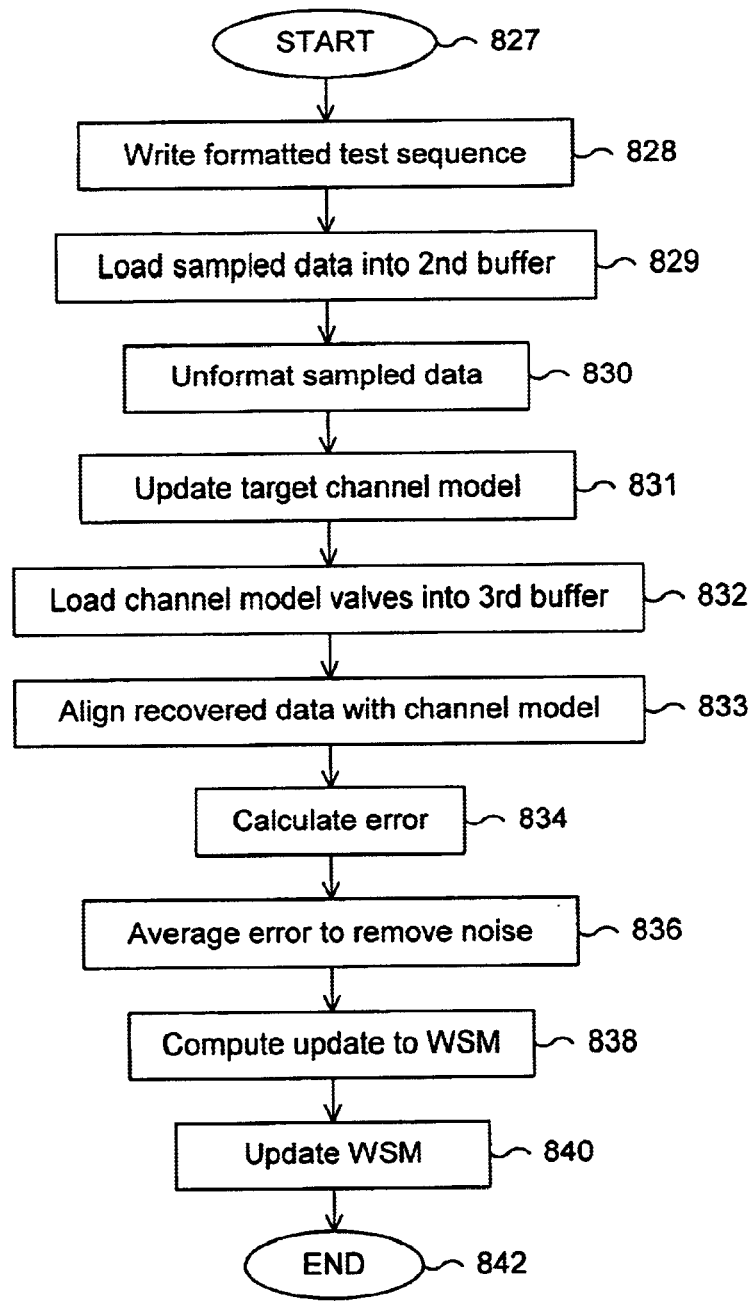

FIGS. 8A and 8B illustrate the write compensation process used in one embodiment and described in detail above. FIG. 8A is a flow chart illustrating the process for initializing the write strategy matrix using a type I pattern and preparing to update the write strategy matrix using a type II pattern. The process starts at 800. In a step 802, the dynamic range of the system is determined and level placement is set. Static nonlinear noise may also be removed in this step.

In a step 804, a type I pattern is written to the media. The pattern is read and aligned in a step 806. Average levels and noise statistics are computed in a step 808. The dynamic range is identified in a step 810. In a step 812, levels are placed according to a level placement scheme such as ELC or CDC. The write strategy matrix is initialized in a step 814. In an embodiment where a slope based update is used, the slope of the media response curve is calculated and a convergence factor is determined. Next, in a step 816, a type-II pattern is loaded into a first buffer and the start of the type-II pattern in the first buffer is located. At this point, the system is ready to update to the write strategy matrix in step 818, which is described further in FIG. 8B.

Once the write strategy matrix is updated, it is determined whether the process has converged so that the error is below a threshold selected for the purpose of defining an acceptable error and allowing the iterations to end. If the error is not below the threshold, then control is transferred to a step 822 where it is determined whether the maximum number iterations have occurred. If not, then further iterations are executed until the process converges to an error that is less than the threshold. If the maximum number of iterations are executed without reducing the error below the threshold, then an error signal is generated in a step 824 and a process may be executed to attempt to recover from the failure.

FIG. 8B is a flow chart illustrating in further detail updating the write strategy matrix. A formatted test sequence is written in a step 828. Sampled data output from the read channel front end is loaded into a second buffer in a step 829. The sampled data is unformatted in a step 830 and the target channel model is updated in a step 831. As mentioned above, the channel model is a linear channel model in one embodiment and the linear channel model can be either fixed or dynamic.

Channel model values are loaded into a third buffer in a step 832. If a fixed channel model is used, then this need only be done once. The recovered data is aligned with the channel model in a step 833. In one embodiment, the pattern is stored, rather than generated dynamically by a shift-register. Recovered data is matched to the stored data, after the start-up formatting is removed. The start of the type-II pattern is located in the second by locating the timing-zero locator sequence (TZL) sequence.

In a step 834, the channel model output is subtracted from the recovered samples to obtain a remaining systematic error (plus noise). The error is averaged over a number of triplets to remove noise in a step 836. The update to the write strategy matrix is computed in a step 838. Computing the update in a fixed size update system includes simply determining a sign or direction for the update step. If a slope update method is used, then the update is computed based on the measured slope and convergence factor. In some embodiments, parallel updates may be computed and it is determined which update is the best at a later time. In a step 840, the write strategy matrix is updated. The process ends at 842.

A system and method for write compensating have been described. Write compensation causes the output of the channel to conform to a target channel model within some measure of error. The target channel model may be static or dynamic, with various constraints being defined for dynamic channel models. One preferred constraint is that the target channel model be linear. Conforming the compensated channel output to a linear channel allows the channel output to be equalized properly. Write compensation is accomplished using a write strategy matrix that maps input subsequences to one or more write strategy parameters. The write strategy matrix is adjusted by writing type II data to the storage media, reading the data from the media, and calculating the difference between the read data and the type II data transformed by the target channel model.

Other write strategy parameters or measures of the effectiveness of the write strategy may be optimized using a write strategy matrix as described above. For example, signal dynamic range can be optimized as part of the write strategy update process. In addition, it should be noted that although an optical data storage channel has been described in detail, the present invention is also applicable to other types of storage channels as well as general communications channels that do not include storage.

The write strategy matrix optimization procedure described above may also be applied to recording signals that have been modulated with methods other than multi-level modulation. In one embodiment, a write strategy matrix is calculated using techniques similar to those described above to optimize the precise placement of threshold crossings from an eight-to-fourteen modulated (EFM) signal.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of compensating a data writing process in an optical disc data storage channel, the method comprising:

deriving a write strategy matrix by adjusting elements of the write strategy matrix to reduce a difference between output data recovered from the optical disc data storage channel and data transformed using a target channel model, wherein the write strategy matrix maps a plurality of input sequences to a plurality of write strategy parameters, the input sequences each including a plurality of input data elements;

receiving an input sequence; and using the write strategy matrix to determine a selected write strategy parameter that corresponds to the input sequence.

2. A method of compensating as recited in claim 1 wherein the write strategy parameters are configured to control the time course of writing laser pulses.

3. A method of compensating as recited in claim 1 wherein the optical disc is an optical phase change disc.

4. A method of compensating as recited in claim 1 wherein each input sequence corresponds to a set of write strategy parameters.

5. A method of compensating as recited in claim 1 wherein the input sequence consists of three data elements.

6. A method of compensating as recited in claim 1 wherein the write strategy matrix is derived so that detected signal transitions in the output from the optical disc data storage channel are adjusted to occur at desired points in time.

7. A method of compensating as recited in claim 1 wherein the write strategy matrix is derived so that detected signal levels are adjusted.

8. A method of improving a write strategy matrix that maps a plurality of input sequences to a plurality of write strategy parameters, the input sequences each including a plurality of input data elements, the method comprising:

writing a set of input sequences to an optical data storage channel using the write strategy matrix;

transforming the set of input sequences using a target channel model to obtain transformed data;

recovering output data from the optical data storage channel;

comparing the recovered output data to the transformed input data to determine a difference between the recovered output data and the transformed input data; and adjusting the write strategy matrix to decrease the difference between the recovered output data and the transformed input data.

9. A method of improving a write strategy matrix as recited in claim 8 wherein the target channel model is a fixed channel model.

10. A method of improving a write strategy matrix as recited in claim 8 wherein the target channel model is a dynamic channel model.

11. A method of improving a write strategy matrix as recited in claim 8 wherein the target channel model is a linear channel model.

12. A method of improving a write strategy matrix as recited in claim 8 wherein the target channel model is a linear dynamic channel model.

13. A method of improving a write strategy matrix as recited in claim 8 further including adjusting the target channel model to increase the similarity of the transformed input data to the recovered output data.

14. A method of improving a write strategy matrix as recited in claim 8 wherein adjusting the write strategy matrix to decrease the difference between the recovered output data and the transformed input data includes adjusting the write strategy matrix by a fixed amount.

15. A method of improving a write strategy matrix as recited in claim 8 wherein adjusting the write strategy matrix to decrease the difference between the recovered output data and the transformed input data includes adjusting the write strategy matrix by an amount that is determined by the difference between the recovered output data and the transformed input data.

16. A method of improving a write strategy matrix as recited in claim 8 wherein adjusting the write strategy matrix to decrease the difference between the recovered output data and the transformed input data includes adjusting the write strategy matrix by a plurality of amounts and determining which of the plurality of amounts decreases the difference between the recovered output data and the transformed input data most effectively.

17. A method of improving a write strategy matrix as recited in claim 8 wherein adjusting the write strategy matrix to decrease the difference between the recovered output data and the transformed input data includes adjusting the write strategy matrix by a plurality of amounts and determining which of the plurality of amounts decreases the difference between the recovered output data and the transformed input data by the greatest amount.

18. A method of deriving a write strategy matrix that maps a plurality of input sequences to a plurality of write strategy parameters, the input sequences each including a plurality of input data elements, the method comprising:

writing a first input sequence to an optical data storage channel;

recovering a first sequence of output data from the optical data storage channel;

using the first sequence of output data to map the plurality of data elements to a plurality of initial write strategy parameters;

writing a second input sequence to the optical data storage channel using the initial write strategy parameters, the second input sequence including a plurality of subsequences;

recovering a second sequence of output data from the optical data storage channel;

using the second sequence of output data to map the plurality of subsequences to the plurality of write strategy parameters.

19. A method of deriving a write strategy matrix as recited in claim 18 wherein the first input sequence is configured to determine the dynamic range of the optical data storage channel and wherein the plurality of initial write strategy parameters are configured to use less than the entire dynamic range of the optical data storage channel.

20. A method of deriving a write strategy matrix as recited in claim 18 wherein the first sequence is configured to control intersymbol interference.

21. A method of deriving a write strategy matrix as recited in claim 18 wherein the first sequence includes a series of repeated symbols.

22. A method of deriving a write strategy matrix as recited in claim 18 wherein the plurality of subsequences have a given length and wherein the plurality of subsequences include all possible subsequences of the given length.

23. A method of deriving a write strategy matrix as recited in claim 22 wherein the given length is three.

24. A method of deriving a write strategy matrix as recited in claim 18 wherein the plurality of subsequences have a given length and wherein the second sequence include all possible subsequences of a length that is greater than the given length.

25. A method of deriving a write strategy matrix as recited in claim 24 wherein the given length is three and the length that is greater than the given length is five.

26. A method of deriving a write strategy matrix as recited in claim 18 wherein the initial write strategy parameters are derived such that three or more output levels corresponding to the input data elements are evenly spaced.

27. A method of deriving a write strategy matrix as recited in claim 18 wherein the initial write strategy parameters are derived such that three or more output levels corresponding to the input data elements are spaced based on the variance of the distribution of the output data in the first sequence of output data about the output levels.

28. A method of deriving a write strategy matrix that maps a plurality of input sequences to a plurality of write strategy parameters, the input sequences each including a plurality of input data elements, comprising:
writing an input sequence to an optical data storage channel, the input sequence including a plurality of subsequences;
recovering a sequence of output data from the optical data storage channel;
using the sequence of output data to adjust a map of the plurality of subsequences to the plurality of write strategy parameters according to a difference between the sequence of output data and data transformed using a target channel model.

29. A method of deriving a write strategy matrix as recited in claim 28 wherein the plurality of subsequences have a given length and wherein the plurality of subsequences include all possible subsequences of the given length.

30. A method of deriving a write strategy matrix as recited in claim 28 wherein the plurality of subsequences have a given length and wherein the input sequence includes all possible subsequences of a length that is greater than the given length.

31. A method of improving a write strategy matrix that maps a plurality of input sequences to a plurality of write strategy parameters, the input sequences each including a plurality of input data elements, comprising:
transforming the set of input sequences using a target channel model to obtain a first set of transformed data;
transforming the set of input sequences using a simulated channel model to obtain a second set of transformed data;
comparing the first set of transformed data to the second set of transformed data to determine a difference between the first set of transformed data to the second set of transformed data; and
adjusting the write strategy matrix to decrease the difference between the first set of transformed data to the second set of transformed data.

32. A method of improving a write strategy matrix as recited in claim 31 wherein the simulated channel model is obtained by writing a set of input sequences to an optical data storage channel using the write strategy matrix and recovering output data from the optical data storage channel.

33. A method of improving a write strategy matrix that maps a plurality of input sequences to a plurality of write strategy parameters, the input sequences each including a plurality of input data elements, the method comprising:
writing an input sequence to an optical data storage channel using the write strategy matrix;
transforming the input sequence using a target channel model to obtain transformed data;
recovering output data from the optical data storage channel;
comparing the recovered output data to the transformed input data to determine a difference between the recovered output data and the transformed input data; and
adjusting the write strategy matrix to decrease the difference between the recovered output data and the transformed input data.

34. A system for compensating a data writing process in an optical disc data storage channel, the system comprising:
a data input for receiving an input sequence;
a write strategy matrix configured to reduce a difference between recovered output data from the optical disc data storage channel and data transformed using a target channel model, wherein the write strategy matrix maps a plurality of input sequences to a plurality of write strategy parameters, the input sequences each including a plurality of input data elements; and
an output for outputting a selected write strategy parameter that corresponds to the input sequence.

35. A system as recited in claim 34 wherein the write strategy parameters are configured to control the time course of writing laser pulses.

36. A system as recited in claim 34 wherein the optical disc is an optical phase change disc.

37. A system as recited in claim 34 wherein each input sequence corresponds to a set of write strategy parameters.

38. A system as recited in claim 34 wherein the input sequence consists of three data elements.

39. A system as recited in claim 34 wherein the write strategy matrix is derived so that detected signal transitions in the output from the optical disc data storage channel are adjusted to occur at desired points in time.

40. A system as recited in claim 34 wherein the write strategy matrix is derived so that detected signal levels in the output from the optical disc data storage channel are adjusted.

41. A system for improving a write strategy matrix that maps a plurality of input sequences to a plurality of write strategy parameters, the input sequences each including a plurality of input data elements, the system comprising:
a writer configured to write a set of input sequences to an optical data storage channel using the write strategy matrix;

a target channel model for transforming the set of input sequences to obtain transformed data;

a reader configured to recover output data from the optical data storage channel; and a processor configured to compare the recovered output data to the transformed input data to determine a difference between the recovered output data and the transformed input data and adjust the write strategy matrix to decrease the difference between the recovered output data and the transformed input data.

42. A system as recited in claim 41 wherein the target channel model is a fixed channel model.

43. A system as recited in claim 41 wherein the target channel model is a dynamic channel model.

44. A system as recited in claim 41 wherein the target channel model is a linear channel model.

45. A system as recited in claim 41 wherein the target channel model is a linear dynamic channel model.

46. A system as recited in claim 41 further including a second processor configured to adjust the target channel model to increase the similarity of the transformed input data to the recovered output data.

47. A system as recited in claim 41 wherein the first processor is further configured to adjust the target channel model to increase the similarity of the transformed input data to the recovered output data.

48. A system as recited in claim 41 wherein the write strategy matrix is adjusted by a fixed amount.

49. A system as recited in claim 41 wherein the write strategy matrix is adjusted by an amount that is determined by the difference between the recovered output data and the transformed input data.

50. A system as recited in claim 41 wherein the write strategy matrix is adjusted by a plurality of amounts and it is determined which of the plurality of amounts decreases the difference between the recovered output data and the transformed input data most effectively.

51. A system as recited in claim 41 wherein the write strategy matrix is adjusted by a plurality of amounts and it is determined which of the plurality of amounts decreases the difference between the recovered output data and the transformed input data by the greatest amount.

52. A system for deriving a write strategy matrix that maps a plurality of input sequences to a plurality of write strategy parameters, the input sequences each including a plurality of input data elements, comprising:

a writer configured to write an input sequence to an optical data storage channel, the input sequence including a plurality of subsequences;

a reader configured to recover a sequence of output data from the optical data storage channel; and a processor configured to use the sequence of output data to adjust a map of the plurality of subsequences to the plurality of write strategy parameters according to a difference between the sequence of output data and data transformed using a target channel model.

53. A system as recited in claim 52 wherein the plurality of subsequences have a given length and wherein the plurality of subsequences include all possible subsequences of the given length.

54. A system as recited in claim 52 wherein the plurality of subsequences have a given length and wherein the input sequence includes all possible subsequences of a length that is greater than the given length.

55. A system for improving a write strategy matrix that maps a plurality of input sequences to a plurality of write strategy parameters, the input sequences each including a plurality of input data elements, the system comprising:

an input configured to receiving a set of input sequences; and a processor configured to (i) transform the set of input sequences using a target channel model to obtain a first set of transformed data, (ii) transform the set of input sequences using a simulated channel model to obtain a second set of transformed data, (iii) compare the first set of transformed data to the second set of transformed data to determine a difference between the first set of transformed data to the second set of transformed date, and (iv) adjust the write strategy matrix to decrease the difference between the first set of transformed data and the second set of transformed data.

56. A system as recited in claim 55 wherein the simulated channel model is obtained by writing a set of input sequences to an optical data storage channel using the write strategy matrix and recovering output data from the optical data storage channel.

57. A system for improving a write strategy matrix that maps a plurality of input sequences to a plurality of write strategy parameters, the input sequences each including a plurality of input data elements, comprising:

a writer configured to write a set of input sequences to an optical data storage channel using the write strategy matrix;

a reader configured to recover output data from the optical data storage channel; and a processor configured to transform the set of input sequences using a target channel model to obtain transformed data, to compare the recovered output data to the transformed input data, to determine a difference between the recovered output data and the transformed input data and to adjust the write strategy matrix to decrease the difference between the recovered output data and the transformed input data.

58. A method of compensating a data writing process in an optical disc data storage channel, the method comprising:

deriving a write strategy matrix wherein the write strategy matrix maps a plurality of input sequences to a plurality of write strategy parameters, the input sequences each consist of three input data elements;

receiving an input sequence; and using the write strategy matrix to determine a selected write strategy parameter that corresponds to the input sequence.

59. A system for compensating a data writing process in an optical disc data storage channel, the system comprising:

a data input for receiving an input sequence;

a write strategy matrix wherein the write strategy matrix maps a plurality of input sequences to a plurality of write strategy parameters, the input sequences each consisting of three input data elements; and an output for outputting a selected write strategy parameter that corresponds to the input sequence.

* * * * *